United States Patent [19]
Groves

[11] Patent Number: 5,537,536
[45] Date of Patent: Jul. 16, 1996

[54] APPARATUS AND METHOD FOR DEBUGGING ELECTRONIC COMPONENTS THROUGH AN IN-CIRCUIT EMULATOR

[75] Inventor: Andrew Groves, Hillsboro, Oreg.

[73] Assignee: Intel Corporation, Santa Clara, Calif.

[21] Appl. No.: 575,252

[22] Filed: Dec. 20, 1995

Related U.S. Application Data

[63] Continuation of Ser. No. 263,134, Jun. 21, 1994, abandoned.

[51] Int. Cl.⁶ .................................................. G06F 11/30
[52] U.S. Cl. ............................... 395/183.04; 364/232.8; 364/DIG. 1
[58] Field of Search ........................ 395/183.04, 183.05, 395/400, 500; 364/232.8, 232.3, DIG. 1, 231.6; 371/28

[56] References Cited

U.S. PATENT DOCUMENTS

| | | | |
|---|---|---|---|
| 4,674,089 | 6/1987 | Poret et al. .............................. | 371/25 |
| 4,796,258 | 1/1989 | Boyce et al. ........................... | 371/16.2 |
| 5,056,013 | 10/1991 | Yamamoto ............................. | 395/500 |
| 5,132,971 | 7/1992 | Oguma et al. ......................... | 371/16.2 |
| 5,329,471 | 7/1994 | Swoboda et al. ...................... | 364/578 |
| 5,333,307 | 7/1994 | Shirk et al. ............................ | 395/575 |

OTHER PUBLICATIONS

Pasternak & Hike, In Circuit–Emulation in ASIC Architectural Core Designs, ASIC '89 (IEEE) Second Annual Seminar, at pp. 6–4.1.

Cravatta, Logic Cell Emulation for ASIC In–Circuit Emulators, ASIC '90 (IEEE) Third Annual Seminar, at pp. 5–2.1.

*Primary Examiner*—Robert W. Beausoliel, Jr.
*Assistant Examiner*—Alan M. Fisch
*Attorney, Agent, or Firm*—Blakely, Sokoloff, Taylor & Zafman

[57] ABSTRACT

A circuit controlling the transmission of information from a testing probe to an ICE™ base unit for debugging an electronic component having a dedicated bus. The circuit comprises a plurality of gate arrays coupled together to operate in a pipeline fashion. Each of the plurality of gate arrays includes a bus tracking component, a formatting component, filtering circuitry and address translation circuitry. The bus tracking component monitors the dedicated bus and transfers internal command signals to its associated formatting component and formatting components of the other gate arrays. The formatting component transfers only completed data to the ICE™ base unit for tracing. If in "Format" mode, the formatting component synchronously aligns the completed data and its associated addressing information before transferring such information to the ICE™ base unit. In "Raw" mode, however, information from the electronic component is immediately transferred to the ICE™ base unit without alignment. The filtering circuitry enables selective tracing of a type(s) of bus cycle(s) by signaling the ICE™ base unit whether or not to trace the frame during this particular bus cycle. The address translation circuitry calculates various address information required by the ICE™ base unit but is not transmitted by the electronic component to minimize required operations by word recognizers in the ICE™ base unit.

44 Claims, 12 Drawing Sheets

APPARATUS AND METHOD FOR DEBUGGING ELECTRONIC COMPONENTS THROUGH AN IN-CIRCUIT EMULATOR

This is a continuation application of application Ser. No. 08/263,134, filed Jun. 21, 1994, now abandoned.

BACKGROUND OF THE INVENTION

1. Field of the Invention

The present invention relates to the field of integrated circuits. More particularly, the present invention relates to an apparatus and method for debugging an electronic component or software executed by the electronic component to correct logical errors or programming errors, respectively.

2. Background of Art Related to the Invention

For many years, integrated circuit designers and software programmers have used an in-circuit emulator ("ICE™") to debug software code or hardware, typically a central processing unit ("CPU") defined herein as an "intelligent" integrated circuit such as a microprocessor, micro-controller and the like. The ICE™ is a non-intrusive debugging tool that uses external hardware to emulate operations of the CPU embedded in a target system (i.e., a product prototype). As a result, certain results (output voltages, contents of storage elements, etc.) from these operations are traced (i.e., recorded) in memory of the ICE™.

The external hardware consists of a conventional testing probe which latches information from the CPU and directly uploads the information to an ICE™ base unit for storage in trace memory and later retrieval therefrom for debugging purposes. The conventional testing probe includes a number of programmable CMOS logic cell arrays ("LCAs") such as, for example, XC 2000 or 3000 series manufactured by Xilinx, Inc. of San Jose, Calif., which are electrically connected with the CPU mounted on the conventional testing probe. The CPU is then electrically connecting the target system as if it was embedded in the target system. The LCAs are arranged into a circuit for latching information from the CPU and transferring such information to the ICE™ base unit through a communication link. However, this construction affords many disadvantages.

One disadvantage associated with the conventional testing probe is that it merely transfers information between the CPU and the ICE™ base unit without being able to modifying the information in certain situations to reduce communication complexity between the LCAs and the ICE™ base unit as well as the LCAs themselves.

Another disadvantage associated with the conventional testing probe is that the LCAs typically can not support CPUs operating at high frequencies in the range of 65 mega-hertz ("MHz"). Thus, with advancements in CPU technology, these conventional testing probes will prohibit the ICE™ from debugging these CPUs and perhaps such software controlling the CPUs.

A further disadvantage is that LCAs within the conventional testing probe are incapable of performing a number of desired functions, including but not limited to filtering bus cycles for selectively tracing a particular type(s) of bus cycle(s), eliminating storage of unnecessary information in the ICE™ base unit (typically due to wait states and/or termination of the current bus cycle) and tracing snoop bus cycles to ascertain all activity on the CPU bus.

Yet another disadvantage associated with the conventional testing probe is that it is incapable of outputting information, particularly data and address, to the ICE™ base unit in a synchronous manner to increase performance efficiency by as much as fifty percent (50%).

Another disadvantage is that the conventional testing probe is incapable of generating address information required by the ICE™ base unit in the event that such address information is not provided by the CPU.

Therefore, it is contemplated that there exists a need for a circuit within the testing probe for enabling a CPU or software to be debugged at high operating frequencies ($\geq 65$ MHz), reducing complexity of the ICE™ base unit and enabling many additional functions to be performed as mentioned above.

BRIEF SUMMARY OF THE INVENTION

In light of the foregoing, it is appreciated that there exists a need for a circuit and method controlling the transmission of information from a testing probe to an ICE™ base unit for debugging an electronic component operating at high frequencies. The present invention comprises a plurality of gate arrays coupled together to operate in a pipelined fashion. Each of the gate arrays includes a bus tracking component, a formatting component, filtering circuitry and address translation circuitry.

The bus tracking component of one of the gate arrays monitoring the CPU bus and transfers internal command signals to its formatting component as well as those formatting components with other gate arrays. These internal command signals provide control information to the formatting components of each of the gate arrays to indicate when to latch information and/or transfer the information to the ICE™ base unit. The bus tracking component comprises three state machines. A first state machine generates a first internal command signal "LEADS" indicating that a snoop cycle has occurred on the CPU bus. A second and third state machines operate in the alternative to track bus cycles on the CPU bus during non-DMA and DMA operations, respectively.

The formatting component transfers only completed data to the ICE™ base unit for tracking sequences. In Format mode, the formatting component synchronously aligns the completed data and its associated addressing information before transferring such information to the ICE™ base unit. In "Raw" mode, however, information from the CPU is immediately transferred to the ICE™ base unit without alignment. The formatting component comprises a holding element and a formatting controller. The holding element is a combinatorial logic circuit including storage elements for holding data or address, snoop request addresses and a write back replacement address and multiplexers for selecting when certain information is to be transferred. The formatting controller includes four state machines for controlling the operations of the holding elements in transferring information to an ICE™ interface circuit being a generic combinatorial logic circuit to select which information is transferred to the ICE™ base unit.

The filtering circuitry enables selective tracing of a type(s) of bus cycle(s) by signaling the ICE™ base unit whether or not to trace the frame input during this particular bus cycle. The filtering circuitry comprises a bus cycle filter and a force filter. The bus cycle filter generates either an active signal if the bus cycle is one of a selected bus cycles or an inactive signal. This signal is transmitted through an output filter line to the force filter. The force filter, on the other hand, is primarily used to filter non-bus type cycles. In the event that either the bus cycle filter or the force filter detects a selected bus or non-bus cycle, a valid trace frame signal is asserted to inform the ICE™ base unit to trace the frame.

The address translation circuitry calculates various address information required by the ICE™ base unit but is not transmitted by the CPU. Such address information includes (i) an upper boundary constraint AH[2:0], to provide the ICE™ base unit with the highest byte address currently on the CPU bus and (ii) a lower boundary constraint A[2:0], collectively with AH[2:0], to provide the ICE™ base unit with a range of byte addresses on the CPU bus. This range allows word recognizers in the ICE™ to recognize byte addresses on a byte granularity whereas without such range, the word recognizers would recognize byte addresses on a packet granularity. The address translation circuitry further alters certain byte enable and address values depending on certain events. More specifically, in the event that the CPU alters its current bus cycle from a non-burst read cycle to a burst read cycle, the outputs BE[3:0]# are set to "0". Otherwise, BE[3:0]# and AH[2:0] are set to "1". Furthermore, in the event that there exists a burst cycle, A[4:3] is incremented as needed to signal burst cycles. The manner of incrementing AH[2:0] is shown in the fifth combinatorial logic circuit of the ICE™ interface circuit.

BRIEF DESCRIPTION OF THE DRAWINGS

The objects, features and advantages of the present invention will become apparent from the following detailed description of the present invention in which.

DETAILED DESCRIPTION OF THE INVENTION

In the following detailed description, the present invention describes a circuit operating in association with a testing probe of an ICE™ designed for actively assisting an ICE™ base unit to debug (i) an electronic component, typically a CPU, operating in a "target" system and/or (ii) software controlling operations of the CPU. In the present application, numerous details are set forth, such as specific combinatorial logic circuits (i.e., an interconnection of standard logic gates, latches, and/or other components which produce at least one output control signal), specific circuit diagrams of gate arrays and components forming the gate arrays and the like. It is apparent, however, to one skilled in the art of circuit design, that the present invention may be practiced through different embodiments than illustrated without deviating from the spirit and scope of the present invention.

In the detailed description, a number of terms are frequently used to describe certain control circuits, signal representations and CPU bus operations which are defined herein. A "state machine" is a combination of conventional logic, typically synchronous in nature, which receives as input at least one control signal containing state information and responds to the control signal through at least one control output. A "multiplexer" is defined as one or more conventional multiplexing logic gates represented as having two inputs arranged to output one of two inputs. A "packet" is generally defined as a plurality of information bits (i.e., binary values of address, control or data signals) being a maximum 64-bits in width, which are transferred in a single bus cycle. The packet may be further categorized according to its contents e.g., a "data packet" being a packet of exclusively data. A "frame" is generally all of the information bits being output from the gate arrays of the testing probe in a single clock cycle.

Additionally, a "bus cycle" is an operation by the CPU which is commenced by driving an address onto the CPU bus and asserting an address strobe signal and is completed by asserting a signal such as a "bus ready" signal. The bus cycle may include a single data transfer or multiple data transfers (i.e., four sequential data transfers are collectively referred to as a "burst" cycle). A "bus sequence" is a series of bus cycles to perform a specific function.

Figure 1:
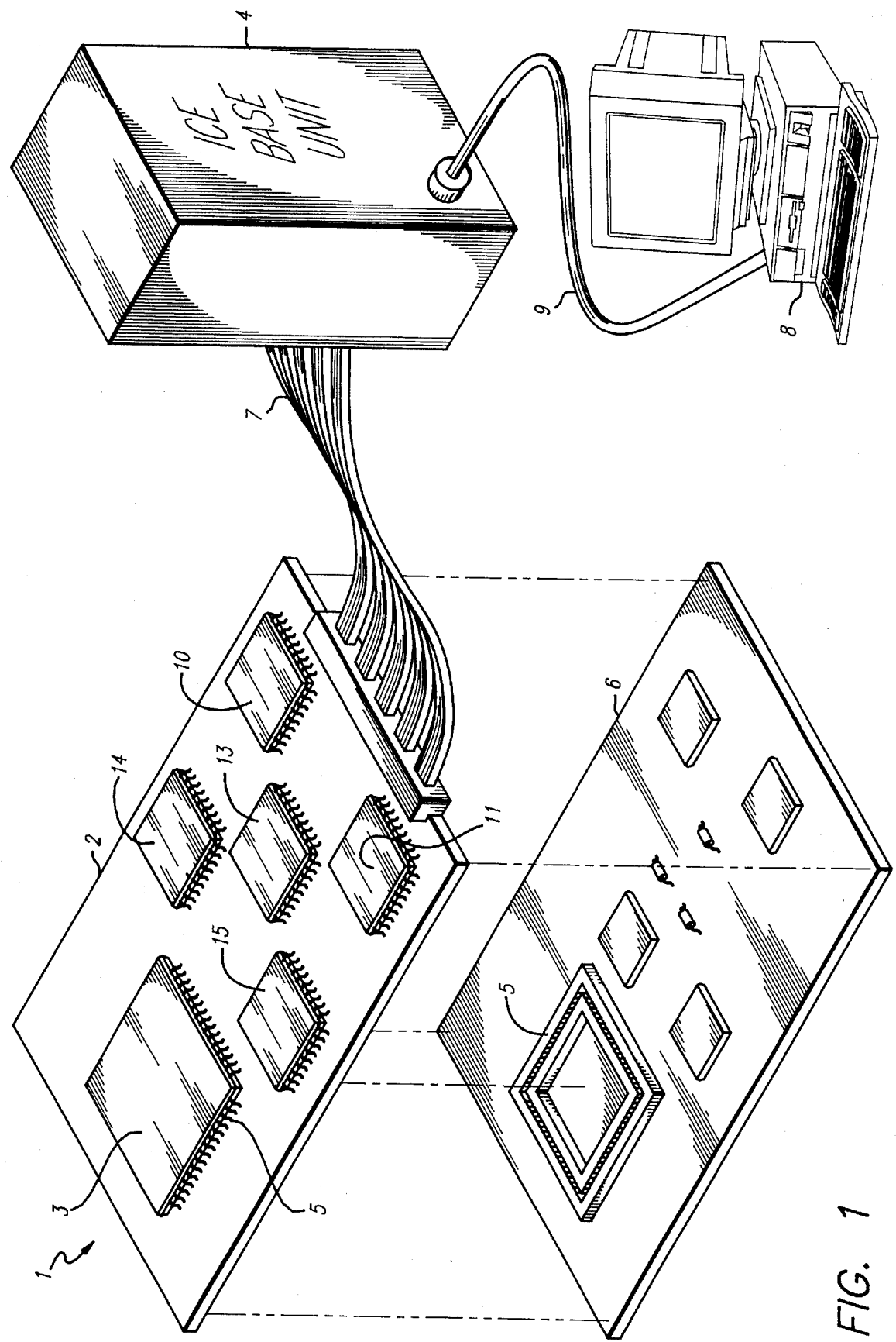
FIG. 1 is a perspective view of an in-circuit emulation ("ICE™") system having a testing probe incorporating a plurality of gate arrays forming the present invention.

Referring to FIG. 1, the ICE™ 1 comprises a testing probe 2 capable of retrieving information on a CPU bus 3a and transmitting re-formatted information to an ICE™ base unit 4 for storage, word recognizing and state sequencing. In a preferred embodiment, the CPU 3 is an Intel® Pentium™ CPU supporting a 64-bit data bus and a 32-bit address bus; however, it is contemplated that the testing probe 2 clearly could be modified in accordance with any CPU specification. For illustrated purposes, however, the description of the preferred embodiment will be discussed in the context of debugging the Pentium™ CPU, although such discussion should not be construed in any way as a limitation on the scope and spirit of the present invention.

One embodiment of the testing probe 2 includes a connector 5 for mechanically and electronically coupling the testing probe 2 to a target system 6 (e.g., a printed circuit board operating as a CPU system) and a plurality of gate arrays 10–14, being standard 0.8 µm CMOS Applied Specific Integrated Circuits, for monitoring information signals output from the CPU bus 3a. The CPU 3 is mounted onto the testing probe 2 after removal from the target system 6 in order to establish electrical contact with the gate arrays 10–14 while still maintaining its pre-removal electrical contact within the target system 6 through the connector 5. If the testing probe 2 is in an appropriate operation mode, it re-formats the information signals from the CPU bus 3a and transfers re-formatted information to the ICE™ base unit 4 through corresponding cables 7 (i.e., ribbon, flex, etc.). The ICE™ base unit 4 operates according to a specific protocol to ascertain whether it should commence "tracing" (i.e., storing) of the re-formatted information. If the ICE™ base unit 4 traces the re-formatted information and detects a command (usually transmitted by a computer system accessible by a test operator ) from a state machine within the ICE™ base unit 4 to discontinue such tracing, the traced re-formatted information is uploaded to the computer system 8 through a communication link 9 for formatting and displaying the information in a visual format and storing the information in a retrievable format.

The testing probe 2 operates in one of three modes; namely, a "Raw" mode, "Format" mode and "Pseudo-Format" mode. In Raw mode, the testing probe 2 monitors information on the CPU bus and generates re-formatted control signals to the ICE™ base unit 4. Such control information is transferred in its entirety as received to the ICE™ base unit 4. This is accomplished by the gate arrays 10–14 emulating that a bus cycle is completed every CLK cycle (defined below). The main purpose of the Raw mode is usually for hardware debug of state machines and interconnects of the target system 6. In the Format mode, the testing probe 2 monitors information output on the CPU bus and generates reformatted signals similar to "Raw" mode. However, the testing probe 2 synchronously aligns (i.e., simultaneously outputs) these re-formatted signals in order to transfer information to the ICE™ base unit 4 after its associated bus cycle has completed, thereby reducing the amount of signal analysis required by the ICE™ base unit 4. Finally, in the Pseudo-Format mode, the testing probe 2 operates alternatively in either the Raw or Format mode, depending on whether a hold acknowledge ("HLDA") signal input into the CPU 3 is asserted or de-asserted, respectively. This is normally done for software debugging of DMA sub-systems.

Figure 2:
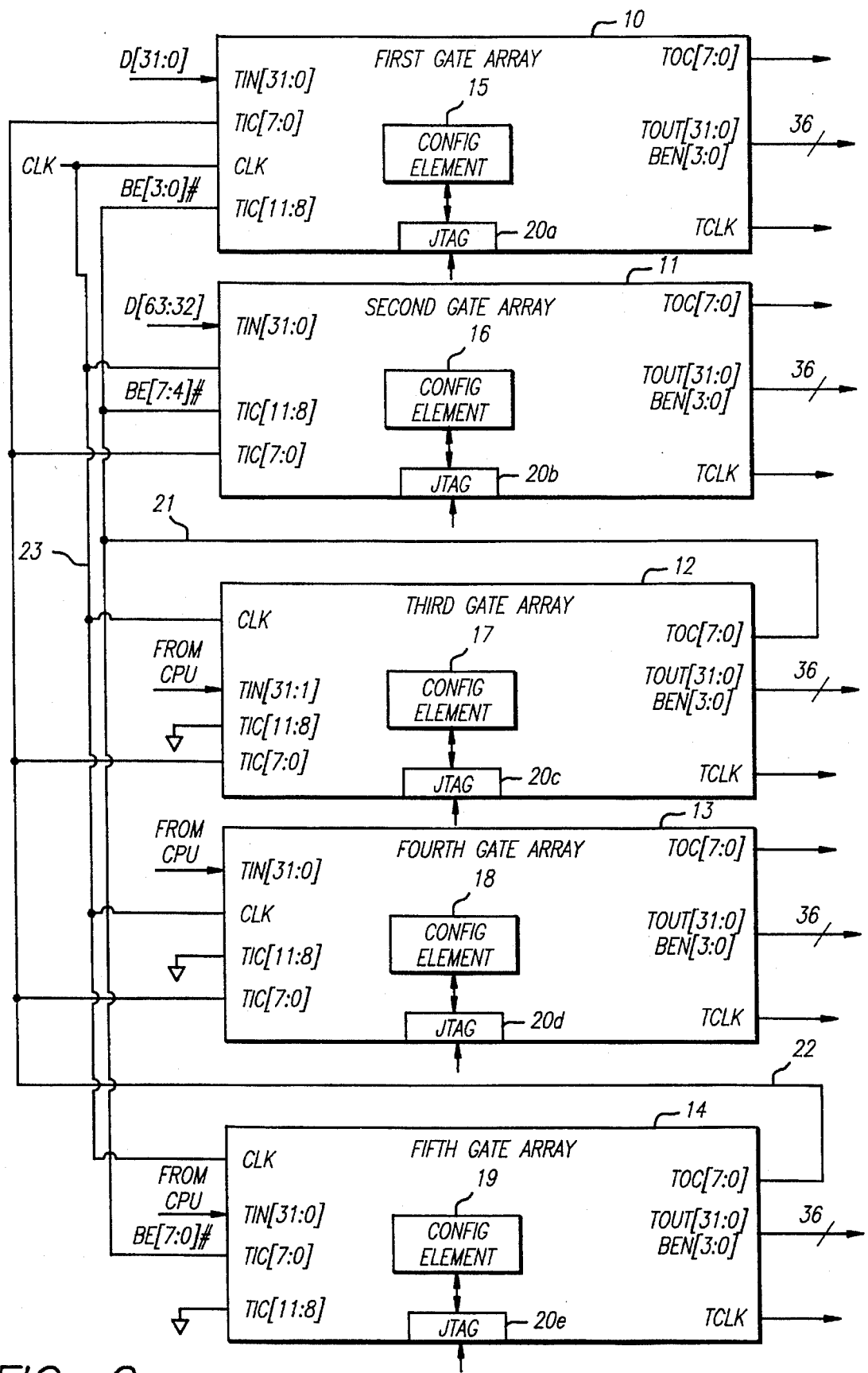
FIG. 2 is a circuit diagram of a preferred embodiment of the present invention incorporated within a plurality of gate arrays.

Referring to FIG. 2, although each of the plurality of gate arrays 10–14 may be identical in physical construction to reduce masking and other manufacturing costs, each gate array may be configured to function in a different manner by programming its respective configuration elements 15–19 (e.g., configuration registers) differently. The configuration elements 15–19 are programmed to select various logic gates (usually multiplexers) within its gate array so that, if desired, each gate array may have a different signal path than the others. Each of the configuration elements 15–19 is accessed for programming purposes through its serial communication port 20a–20e. For example, in this preferred embodiment, a well-known five-pin Joint Test Action Group ("JTAG") serial port (IEEE standard 1149.1) is used to program the configuration elements 15–19.

Depending on how its configuration element 15–19 is programmed, a gate array propagates information through a particular signal path. In the preferred embodiment, the first gate array 10 is configured to receive and monitor a first data packet C"D[31:0]") input into a first port (labeled "TIN[31:0]") from the CPU bus; a plurality of internal command signals input into a second input port (labeled "TIC[7:0]") from the fifth gate array 14; and a plurality of byte enables "BE[3:0]#", being active-low as identified by a "#" symbol, input into a third port (labeled "TIC[11:8]") from the third gate array 12. Thereafter, the first gate array 10 transfers and possibly re-formats a first 36-bit packet to the ICE™ base unit from a first output port labeled "TOUT[31:0]/BEN[3:0]" as enumerated in Table 1 of Appendix A. The 32 least significant bits of the first packet (TOUT[31:0]) are data bits which are stored in trace memory of the ICE™ base unit 4. The four most significant bits (BEN[3:0]), however, are simply used by word recognizers (i.e., range comparators) and state machines in the ICE™ base unit and are not stored in the trace memory. The first gate array 10, as well as the other gate arrays 11–14, further transmits a clock signal ("TCLK") being a buffered version of a CLK signal (defined below) to be used by the ICE™ base unit to timely latch its packets.

The second gate array 11 operates in a manner identical to the first gate array 10, except that it is configured to receive and monitor a second data packet containing a most significant 32-bits of data ("D[63:32]") input into the TIN[31:0] from the CPU bus and a second plurality of byte enables ("BE[7:4]#") input into TIC[11:8]from the fifth gate array 14. The second gate array 11 further receives the plurality of internal command signals into its second input port. The second gate array 11 transfers and possibly re-formats a second 36-bit packet from TOUT[31:0]/BEN[3:0] (see Table 2 of Appendix B for its contents).

The third gate array 12 is configured to receive and monitor as input a third packet from the CPU bus including 21-bits of address starting at a fourth address bit ("A[23:3]") and a plurality of byte enables ("BE[7:0]#") into TIN[31:0] (see Table 3 of Appendix A) and the plurality of internal command signals from the fifth gate array 14. Based on these inputs, the third gate array 12 calculates the three least significant bits of the address ("A[2:0]") and a high address boundary constraint "AH[2:0]" Thereafter, the third gate array 12 transfers a third 36-bit packet to the ICE™ base unit. The third 36-bit packet includes the least significant 24 bits of the address "A[23:0]" and the plurality of byte enables BE[7:0]# (both of which are stored in trace memory) and the high address boundary constraint "AH[2:0]". The third gate array 12 further outputs the plurality of byte enables from a second output port "TOC[7:0]" through a byte-enable bus 21 (discussed below). The third gate array 12 generates A[2:0] and AH[2:0] since these signals are required by the ICE™ base unit to determine what address range is covered by the current address in the event of a burst cycle.

The fourth gate array 13 is configured to receive and monitor a fourth 32-bit packet input into TIN[31:0] from the CPU bus. The fourth packet includes the most significant bytes of the address "A[31:24]" and various snoop and control signals as listed in Table 4 of the Appendix A and defined in Appendix B. Moreover, the internal command signals are input into its second input port "TIC[7:0]" in order to assist in re-formatting the information output to the ICE™ base unit in the fourth 36-bit packet by indicating when to latch certain information and transfer such information to the ICE™ base unit.

The fifth gate array 14 is configured to receive and monitor a fifth packet including majority of the control signals input into its first input port "TIN[31:0] from the CPU bus as listed in Table 5 of Appendix A and defined in Appendix B. The plurality of byte enables BE[7:0]# from the third gate array 12 are input into TIC[7:0] of the fifth gate array 14 through the byte-enable bus 21 for cycle type filtering. Based on these inputs, a number of re-formatted signals are transferred to the ICE™ base unit including a TCLK signal, a fifth 36-bit information packet which comprises a number of control signals including trace output signals providing trace and control information and the internal command signals which are output from the second output port "TOC[7:0]" to each of the first-fourth gate arrays 10–13 (hereinafter referred to as the "remaining gate arrays") through an inter-communication bus 22.

As further shown in FIG. 2, the plurality of gate arrays 10–14 are clocked by an identical clock line 23 which transmits a common buffered clock ("CLK") signal to each gate array 10–14. The CLK signal is derived from an original clock signal of the CPU which is driven into a phased lock loop "PLL" to generate the CLK signal. As a result, the gate arrays 10–14 operate in a synchronous manner. The plurality of gate arrays 10–14 are further coupled together by the inter-communication bus 22 and the byte-enable bus 21 as shown.

As also shown in FIG. 2, the inter-communication bus 22 inputs the plurality of internal command signals generated by a fifth gate array 14 into each of the remaining gate arrays 10–13. These internal command signals provide control information from which a trace signal output can be derived for latching information and/or transfer the information to the ICE™ base unit (i.e., when to re-format the information signals and transfer such re-formatted information signals to the ICE™ base unit). The byte-enable bus 21 is primarily used to signal which bytes of data are to be written to external memory as required by the CPU for a current bus cycle. The byte-enable bus 21 is coupled in its entirety to the fifth gate array 14, but only half of the byte-enable bus 21 is coupled to the first gate array 10 while the other half of the byte-enable bus 21 is coupled to the second gate array 11. Thus, the first gate array 10 monitors a first half of the CPU bus and the second gate array 11 monitors a second half of the CPU bus where each byte-enable is used to specify whether its associated data byte is valid.

Figure 3A:
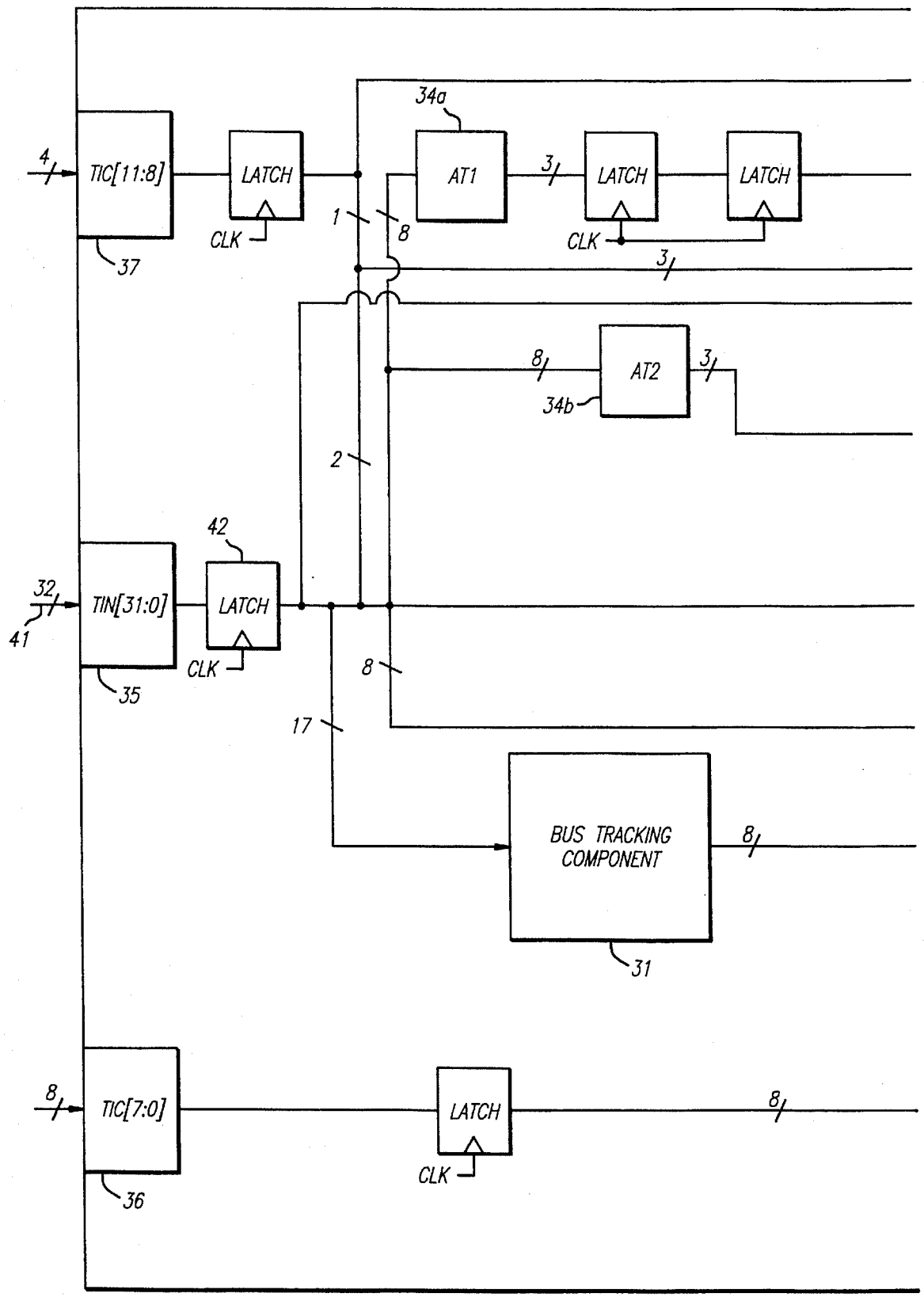
FIGS. 3A–3C is a more detailed circuit diagram of one of the plurality of gate array wherein the gate array comprises a bus tracking component, a formatting component, filtering circuitry and address translating circuitry.
Figure 3B:
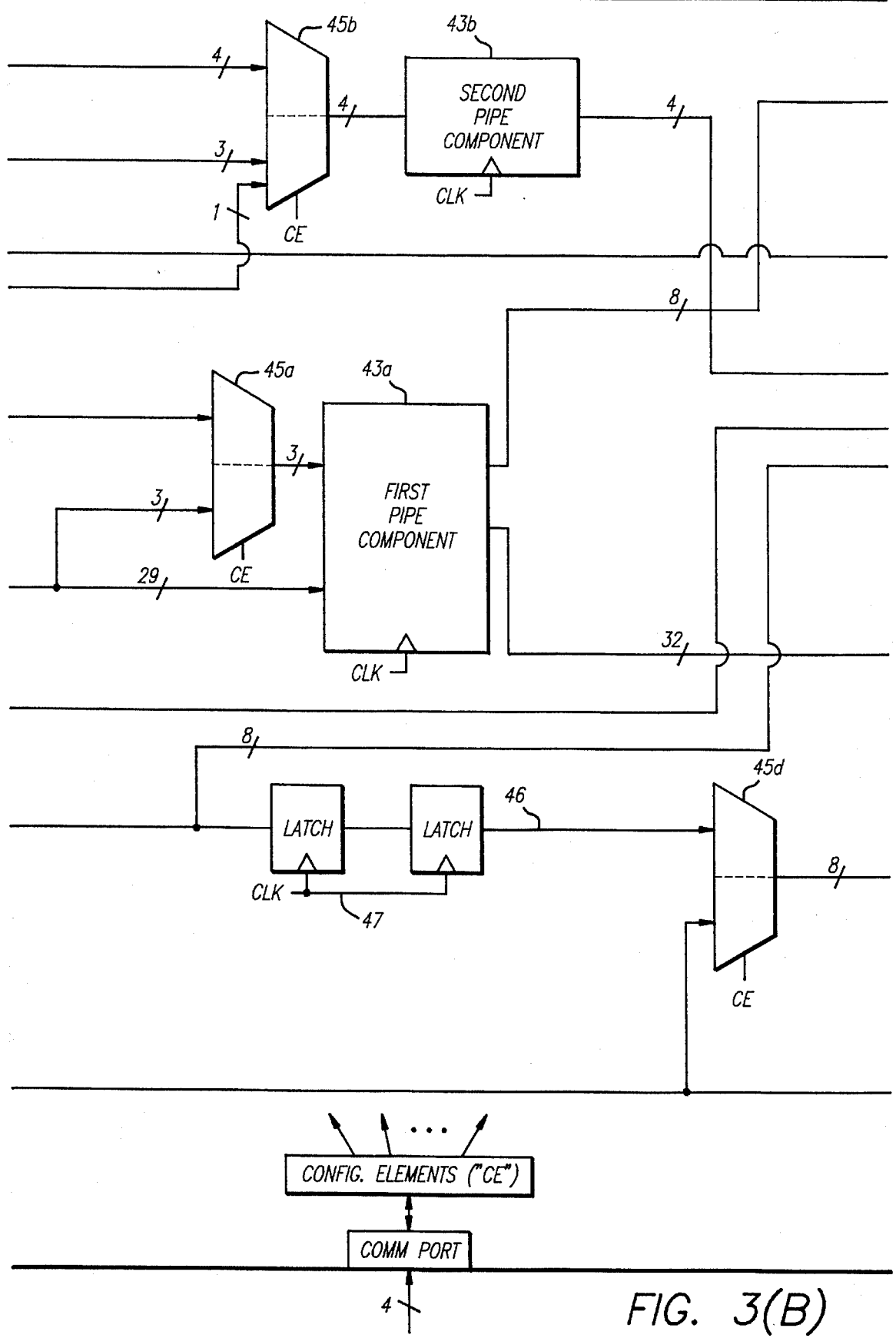
Figure 3C:
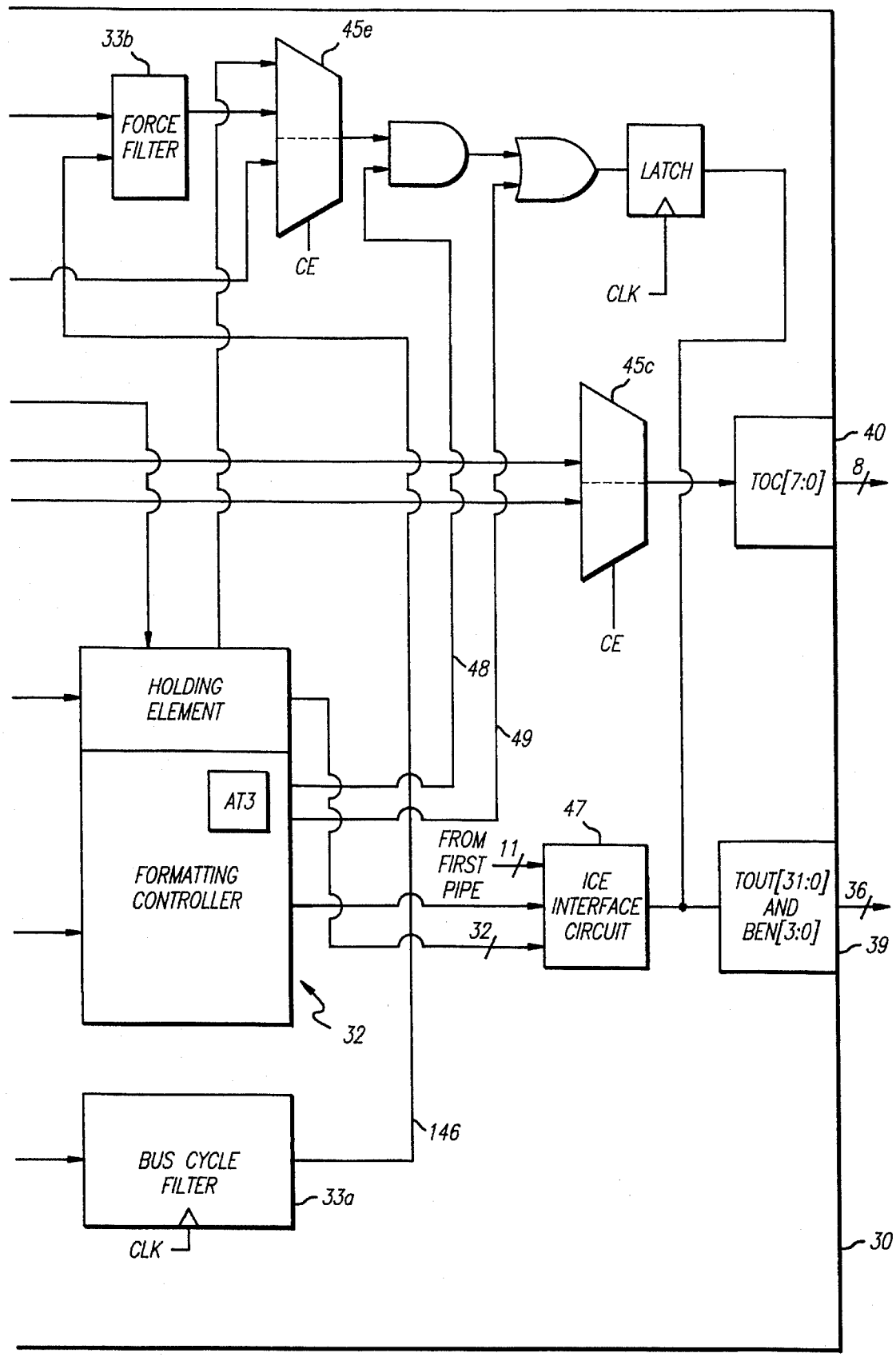

Referring to FIGS. 3A–3C, a preferred embodiment of a gate array 30 having a physical construction identical to each of the plurality of gate arrays is illustrated in a more-detailed circuit diagram. The gate array 30 comprises a bus tracking component 31, a formatting component 32, filtering circuitry 33a and 33b and address translating circuitry 34a–34c. These components and circuitry are coupled together through a variety of combinatorial logic circuits in order to monitor information signals from the CPU, re-format the information signals and transfer such re-formatted information signals to the ICE™ base unit. These combinatorial logic circuits include latches such as conventional D-type flip-flops and other similar logic in order to ensure proper hold and set-up timing for synchronous operations between gate arrays and synchronous output of the re-formatted information signals to the ICE™ base unit. The latches have been illustrated but frequently are not discussed for clarity sake. These combinatorial logic circuits further include a plurality of multiplexers 45a–45e each having two inputs "A" and "B" as labeled. As briefly alluded to above, these multiplexers, selected by one of the configuration elements 15–19, enable the first–fifth gate arrays to enjoy different signal paths while maintaining the same physical construction. For clarity sake, a table indicating which inputs of the multiplexers 45a–45e are selected for each the gate array is illustrated below. The symbol ("X") means that either input may be selected.

TABLE A

| Multiplexer | Selected Multiplexer Inputs | | | | |
|---|---|---|---|---|---|
| | Gate Array | | | | |
| | FIRST | SECOND | THIRD | FOURTH | FIFTH |
| FIRST | B | B | A | B | B |
| SECOND | A | A | B | X | X |
| THIRD | X | X | A | X | B |

TABLE A-continued

| Multiplexer | Selected Multiplexer Inputs | | | | |
|---|---|---|---|---|---|
| | Gate Array | | | | |
| | FIRST | SECOND | THIRD | FOURTH | FIFTH |
| FOURTH | B | B | B | B | A |
| FIFTH | A | A | A | A | B |

The gate array 30 receives information through at least three input ports 35–37 and a serial communication port (e.g., JTAG) 38 and transmits information from a plurality of output ports 39 and 40. The first input port 35 of the gate array 30 ("TIN[31:0]") is a 32-input port for receiving a packet of information (i.e., data, address and/or control signals) from the CPU through a plurality of signal lines 41. Of course, these signal lines 41 are coupled to different outputs of the CPU, depending on the particular gate array.

The information signals of the packet are latched by a latch element 42 and thereafter, a majority of these information signals are input into the bus tracking component 31 and a first pipe component 43a. The first pipe component 43a includes multiple latches coupled together in series to provide sufficient latency between input and output. Additionally, certain information signals from TIN[31:0] are input into various other components since these different gate arrays are required to transfer different information signals and a common structure is used. More particularly, those signals associated with TIN[31:24] are input into a first and second portions 34a and 34b of the address translating circuitry labeled as "AT1" and "AT2" and a third multiplexer 45c to be output through the byte-enable bus 21. Moreover, the information signals of TIN[2:0] are input into a first multiplexer 45a and the information signal of TIN[3] is input into a second multiplexers 45b. In addition, the information signals TIN[17:16] are input into a fifth multiplexer 45e operating in connection with a force filter 33b of the filtering circuitry.

Figure 4:
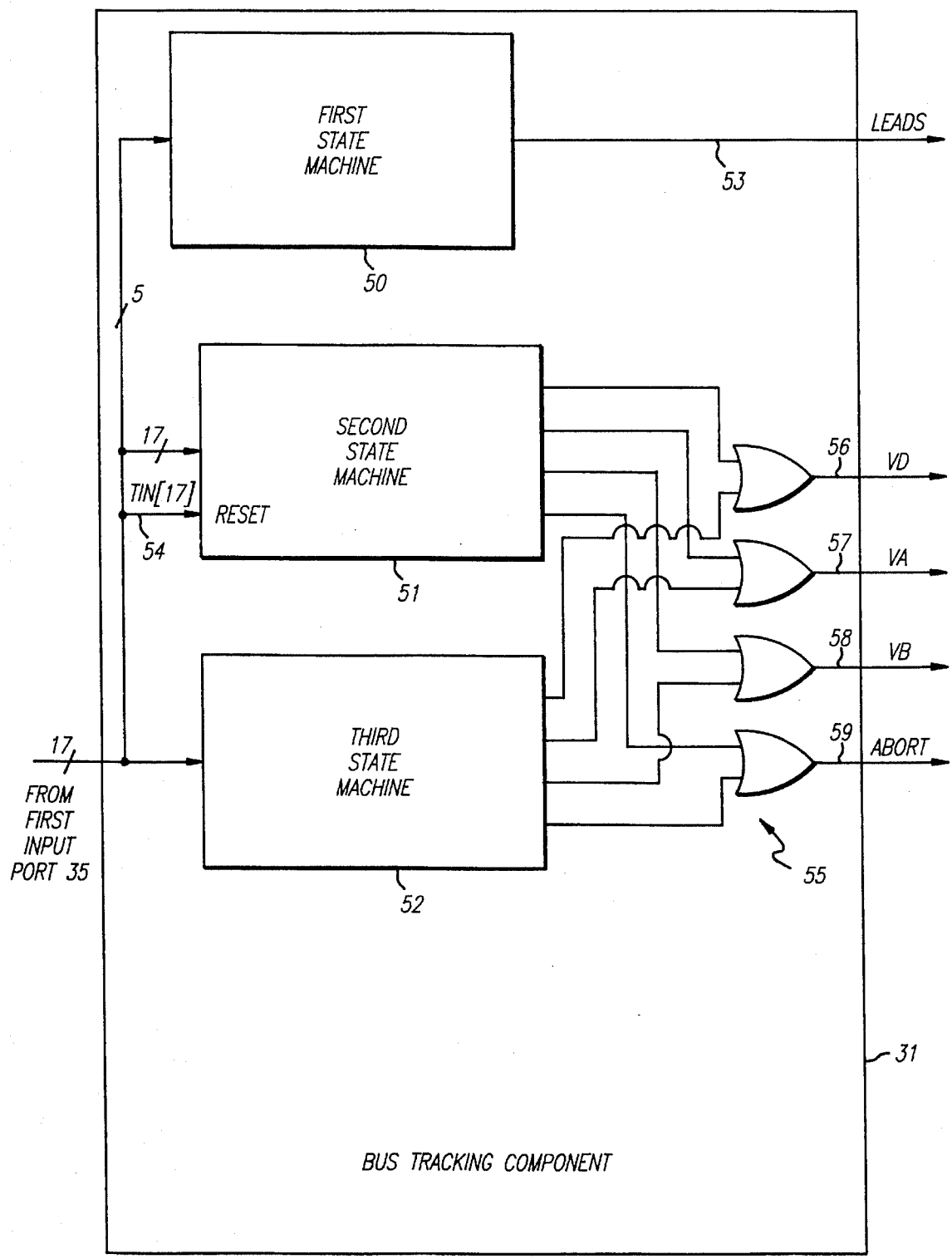
FIG. 4 is a circuit diagram of the bus tracking component.

Referring to FIG. 4, the bus tracking component 31 includes three state machines 50–52 operating as a single unit to generate and transfer the internal command signals (defined below) for tracking the CPU bus and controlling the formatting component to transfer re-formatted information into the ICE™ base unit in a synchronous manner during "Format" mode. A first state machine 50 generates a first internal command signal, Latched External Address Strobe ("LEADS") which is used to indicate that a "Snoop" cycle has occurred on the CPU bus in order to instruct certain state machine(s) within the formatting component 32 of such occurrence. The LEADS signal is based on a number of control signals including HLDA, AHOLD, EADS#, HITM# and BOFF# which are defined in Appendix B. The LEADS signal is active when there is a valid snoop address, being asserted on the Pentium™ CPU, is output from the bus tracking component 31 via a first internal command line 53.

A second and third state machines 51 and 52 operate in the alternative to track bus cycles on the CPU bus. The selection of either the second or third state machines 51 or 52 is dependent on whether the HLDA signal is asserted indicating that a DMA operation is in progress. If the HLDA signal is asserted, the third state machine 52 is in operation while the second state machine 51 remains inactive. If the HLDA signal is de-asserted resetting the third state machine 52 and a Reset line 54 is inactive, the second state machine 51 becomes active; however, if the Reset line 54 is active, the second state machine 51 is reset and the third state machine 52 is active. If protocol errors occur in the second state machine 51, the ICE™ base unit freezes. If protocol errors occur in the third state machine 52, the third state machine 52 flushes all bus cycles and does not accept any new ones.

Each of the second and third state machines 51 and 52 receive as input those control signals inputted into the first input port ("TIN[31:0]") identified by "*" in Table 5 of Appendix A. These control signals are used to generate four additional internal command signals; namely, Valid Data ("VD"), Valid Address ("VA"), Valid Burst ("VB") and Abort ("ABORT"). These four internal command signals from each state machine 51 and 52 are OR'ed together through conventional logic gates 55 to represent when a DMA or non-DMA operation dictates assertion of these command signals. Although it is contemplated that the second and third state machines 51 and 52 are separate as a design choice, it is contemplated that the state machines could be combined so long as the combination functions properly.

The VD command signal indicates whether the CPU recognizes the data. The VA command signal indicates whether the CPU has initiated a bus cycle with a valid address and associated control signals. The VD and VA signals are output from the bus tracking component 31 through a second and third internal command lines 56 and 57. Another one of the plurality of internal command signals includes the VB command signal which indicates whether the CPU is transferring or receiving four 64-bit data packets in a burst cycle. The VB command signal is output from the bus tracking component 31 through a fourth internal command line 58. Another of the internal command signals includes the ABORT command signal which indicates that an external agent requires immediate termination of current bus cycle(s) through its assertion on a fifth internal command line 59. While operating in Raw mode, the third state machine 52 activates the VD and VA signals and deactivates VB and ABORT signals to emulate that the CPU is completing a bus cycle every CLK cycle. Thus, all of the control signals on the CPU bus are transferred to the ICE™ base unit and are traced by the ICE™ base unit.

Referring back to FIGS. 3A–3C, although the bus tracking component 31 is incorporated within each gate array for manufacturing cost savings, only the bus tracking component 31 for the fifth gate array is operational due to the pipeline nature of the gate arrays. Thus, the remaining gate arrays depend on the fifth gate array for these above-described internal command signals.

For illustrative purposes, assuming that the gate array 30 is the fifth gate array, the bus tracking component 31 transfers the internal command signals through two different signal paths. Along a first signal path, the bus tracking component 31 outputs the internal command signals to the remaining gate arrays by transmitting the internal command signals into the third multiplexer 45c, which is selected by its configuration element 19 to output the internal command signals through the second output port 40 labeled "TOC[7:0]". TOC[7:0] of the fifth gate array is coupled to the second input ports 36 "TIN[7:0]" of the remaining gate arrays through the inter-communication bus line 22 (see FIG. 2). The internal command signals are then input into a first input of the fourth multiplexer 45d of that gate array.

Concurrently, along a second signal path, the internal command signals are latched for two clock cycles before being input into a second input of the fourth multiplexer 45d of the fifth gate array. The reason for such delay is that there exists a delay of two clock cycle from generation of the internal command signals in the bus tracking component 31 of the fifth gate array 14 to such signals being input into the fourth multiplexer 45d of another gate array. Thus, the internal command signals are synchronized to be input into each fourth multiplexer 45d of the gate arrays simultaneously. The configuration element for the remaining gate arrays selects the first input of the fourth multiplexer 45d of the remaining gate arrays while the configuration element for the fifth gate array selects the second input so that the internal command signals are input into the formatting component 32.

Figure 5:
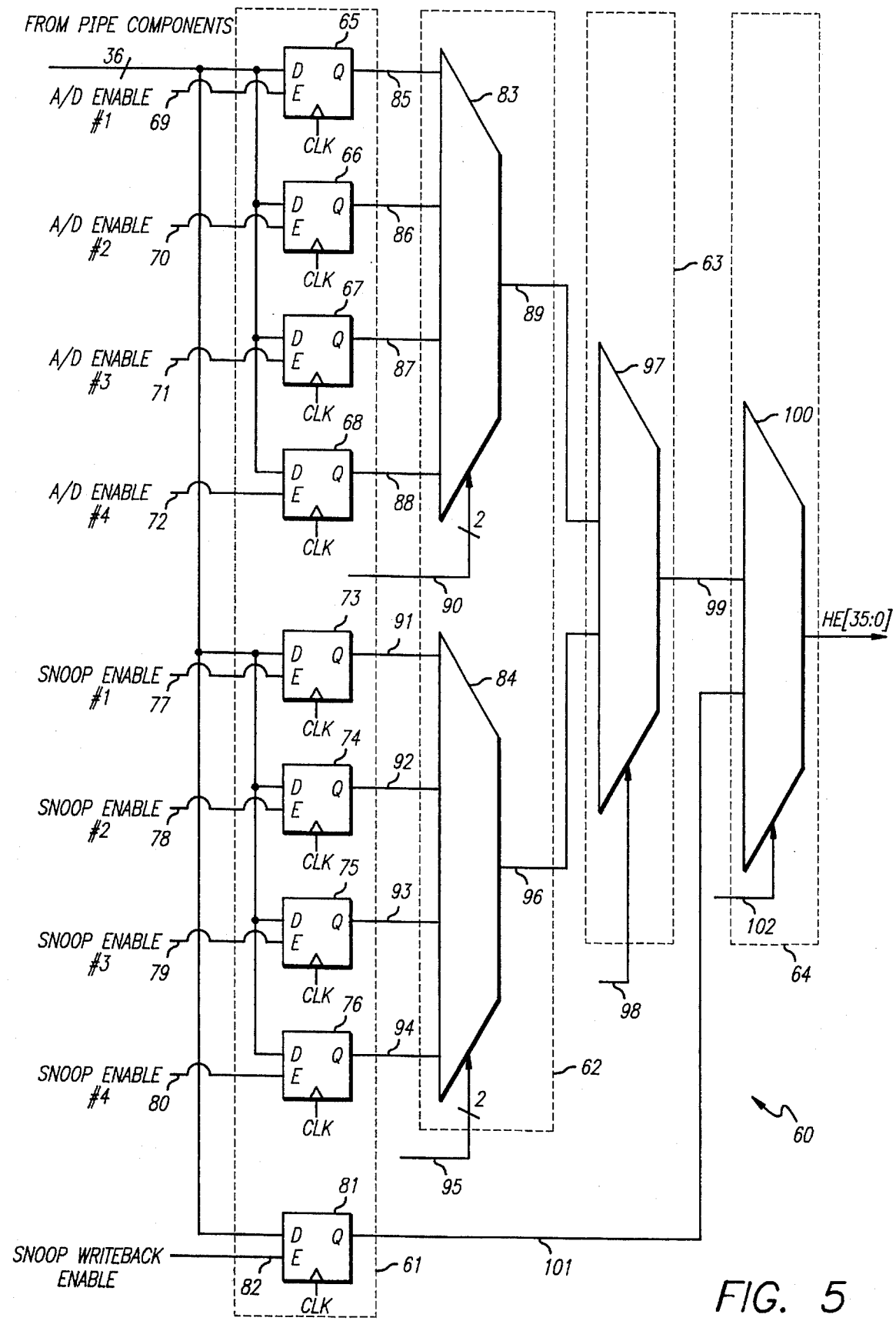
FIG. 5 a circuit diagram of the holding element of the formatting component.

The formatting component 32 comprising a holding element 60 and a formatting controller 110 for controlling the operation of the holding element 60. As shown in FIG. 5, in the preferred embodiment of the present invention, the holding element 60 is a combinatorial logic circuit comprises a plurality of "stages" 61–64 where each stage includes storage elements or multiplexers, all of which are operating in concert to provide temporary storage and proper latency and set-up timing. A first stage 61 of the holding element 60 includes at least four storage elements 65–68 (e.g. each storage element being a number of D-type flip flops with an enable input or any equivalent element) which are employed for temporarily storing information, mainly data and address from the CPU bus (hereinafter referred to as "information storage elements"). One of these information storage elements 65–68 is selected by activating its corresponding address/data ("A/D") enable line 69–72, respectively. Additionally, the first stage 61 includes at least four storage elements 73–76 for temporarily storing a snoop address request placed on the CPU bus (hereinafter referred to as "snoop storage elements") through activating one snoop enable line 77–80 and at least one storage element 81 which is employed for temporarily storing a snoop write back replacement address for Pentium™ Snoop Write Back cycle.

A second stage 62 includes a pair of stage multiplexers 83 and 84. A first stage multiplexer 83 is coupled to the information storage elements 65–68 through corresponding address/data input lines 85–88. The information signal from one of the information storage elements 65–68 is output by the first stage multiplexer 83 through a selected A/D output line 89 according to a binary representation of a plurality of information select lines 90. The second stage further includes a second stage multiplexer 84 coupled to the snoop storage elements 73–76 through corresponding snoop address lines 91–94 acting as inputs and a plurality of snoop address request lines 95 which are coupled to the second stage multiplexer 84 as select lines. Thus, based on the snoop address request lines 95, one of the snoop address requests is output from the second multiplexer 84 through a selected snoop output line 96 to a third stage multiplexer 97.

A third stage 63 includes the third stage multiplexer 97 coupled to the selected A/D and snoop output lines 89 and 96, respectively. Thereafter, either the information being transmitted through the address/data output line 89 or the snoop address request being transmitted through selected snoop output line 96 is transferred upon selection of an AD/snoop select line 98 and output through a selected AD/snoop output line 99 from the third stage multiplexer 97.

A fourth stage 64 includes a fourth stage multiplexer 100 coupled to the selected AD/snoop output line 99 from the third stage 63 and a snoop writeback line 101 transmitting an output from the snoop writeback storage element 81. The 36-bit information packet output from the holding element 60 is selected by a holding element select line 102 to be either the snoop writeback replacement address through selection of the snoop writeback line 101 or information or snoop address request through selection of the AD/snoop output line 99 and output to the output signal bits (labeled "HE[35:0]") of which the four most significant bits are input into the fifth multiplexer 45e as shown in FIG. 3C. For the first, second and fifth gates, these four most significant bits result in values for BEN[3:0] as shown in Tables 1–5 of Appendix A.

Figure 6:
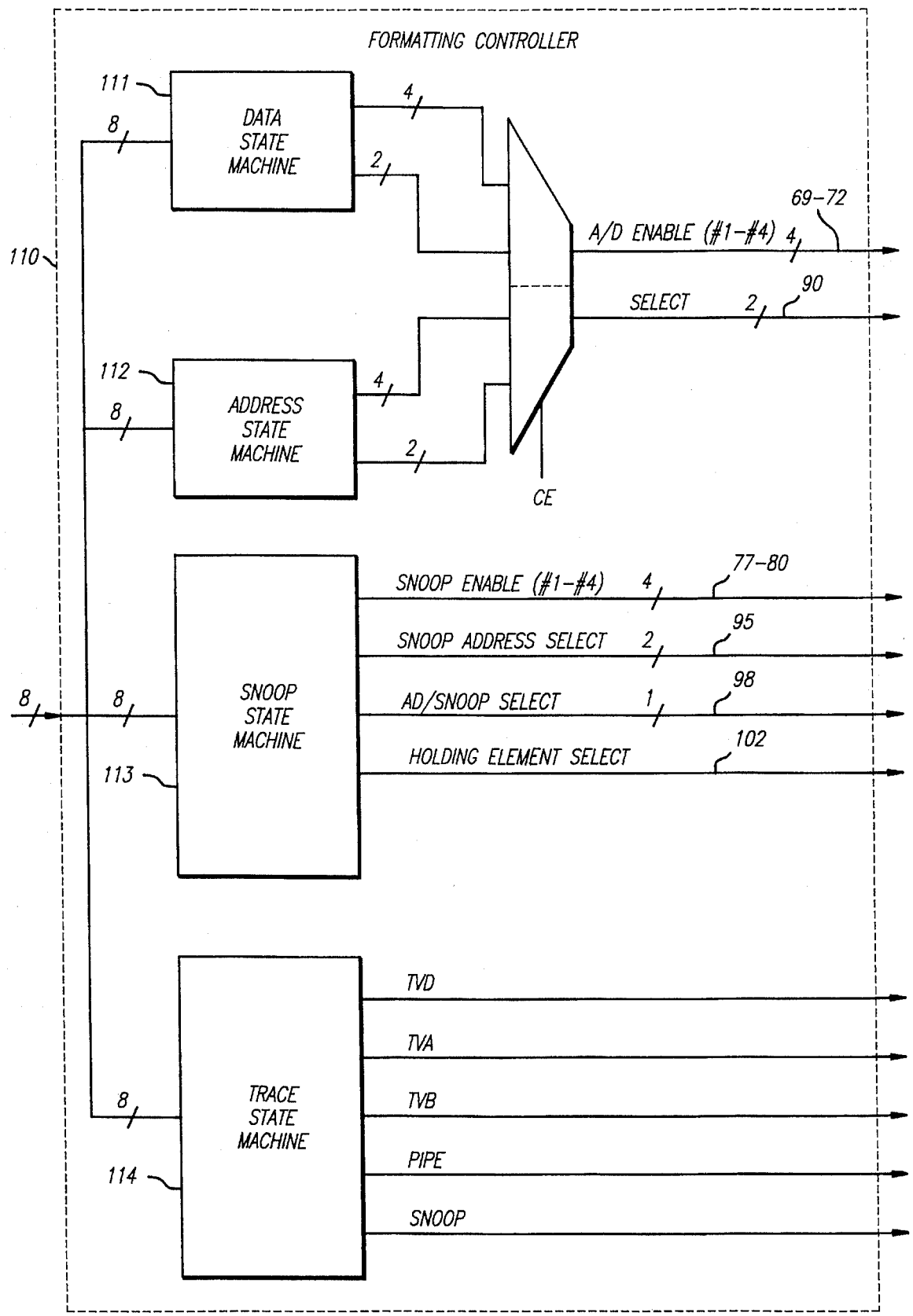
FIG. 6 is a circuit diagram of the formatting controller of the formatting component.

Referring to FIG. 6, the formatting controller 110 includes a plurality of state machines for controlling the holding element 60; namely, a data, address, snoop and trace state machines 111–114, respectively. These plurality of state machines receive certain internal command signals (at least VD, VA, VB, ABORT and LEADS) and active various select signals depending on these internal command signals. Both the data and address state machines 111–112 output those enable signals transmitted through the enable lines 69–72 associated with each of the four information storage elements 65–68 and the plurality of information select lines 90 for selecting one of the information storage elements for transmitting information through the first stage multiplexer 83. The configuration elements select the outputs from the data or address state machines 111 and 112 as input and control of the holding element 60.

The snoop state machine 113 controls the selection of signals through the stages of the holding element 60. More particularly, the snoop state machine 113 selects the appropriate snoop storage element for storing a snoop address request, which snoop address request being output of the second stage multiplexer 84 into the third stage multiplexer 97. Additionally, the snoop state machine 113 generates a select signal along the AD/snoop select line 98 for selecting whether the output of the third stage multiplexer 97 is an (i) address or data, or (ii) snoop address request whether the output of the fourth stage multiplexer 100 is the output of the third stage multiplexer 97 or the snoop write back line 101.

The formatting controller 110 further includes a trace state machine for generating trace output signals TVD, TVA, TVB, PIPE and SNOOP corresponding to the certain internal command signals; namely, VD, VA, VB, ABORT and LEADS. These trace output signals are used by ICE™ software to determine if there exists valid information on the CPU bus. These trace output signals are defined as follows:

(1) Trace Valid Data ("TVD")—indicates that there is valid data on the CPU bus for this frame.

(2) Trace Valid Address ("TVA")—indicates that there exists a valid address on the CPU bus for this frame.

(3) Trace Valid Burst ("TVB")—indicates that this bus cycle is a portion of a burst cycle so that the CPU bus contains four valid data packets.

(4) SNOOP—indicate that there is a valid snoop address on the CPU bus.

(5) PIPE—is a signal used only in "Raw" mode indicating that there exists two pending bus cycles.

Figure 7:
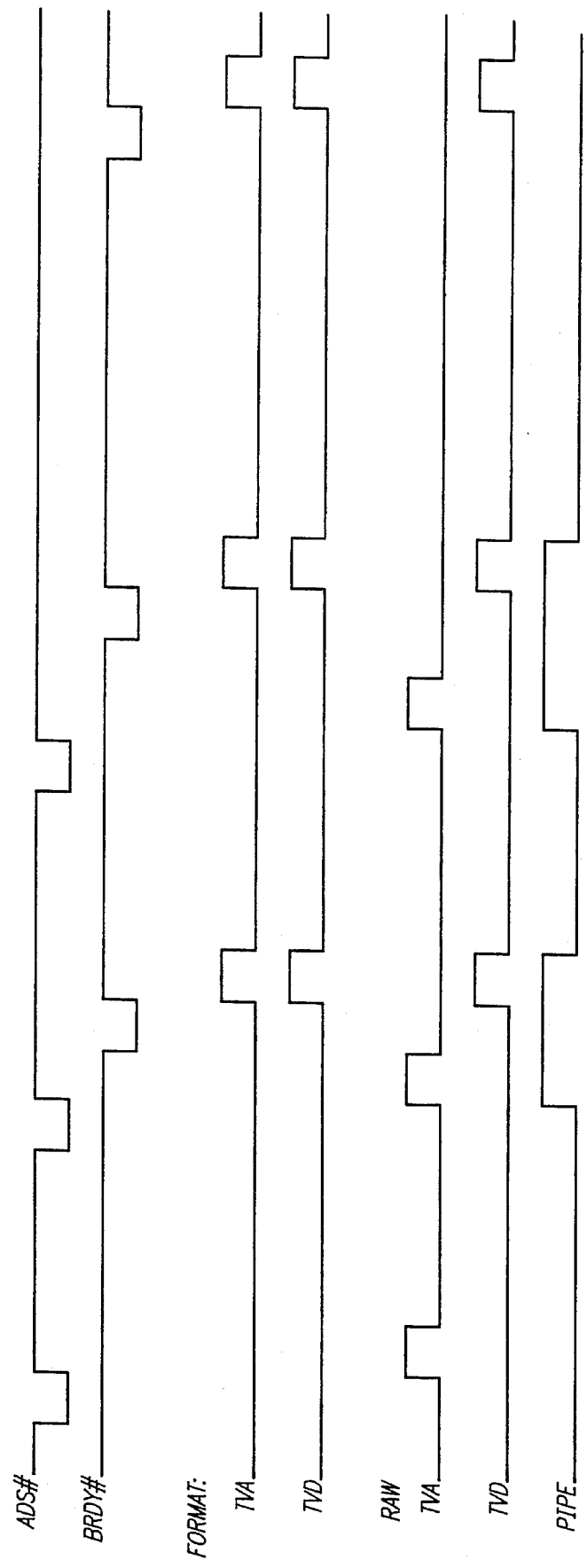
FIG. 7 is a timing diagram of trace signal outputs during normal operations by the CPU.

The difference between the internal command signals and the trace output signals is that the trace output signals are mode dependent and configured accordingly. For example, as shown in a timing diagram of FIG. 7, the CPU is undergoing a single data transfer for each completed bus cycle as shown by the address strobe signal ("ADS#") and the bus ready signal ("BRDY#"). For the format mode, the TVA and TVB trace output signals are re-formatted in an aligned, synchronized manner. In Raw mode, however, the TVA and TVD signals are input into the ICE™ base unit as received so that the ICE™ base unit normally must track which TVA is associated with which TVD. As shown, in the present invention, the ICE™ base unit is not required to track the TVAs and TVDs because this is accomplished through the PIPE trace output signal, which is asserted when an TVA is asserted and de-asserted when the TVD associated with the TVA is asserted and de-asserted. In the event that the trace output signals are not used in favor of tracing all the Pentium™ CPU signals, it is extremely difficult for software to ascertain at any given moment in the trace if one or more bus cycles are pending, unless: (1) the trace is started after the Pentium™ CPU has completed all outstanding bus cycles and is stopped when filled with subsequent Pentium™ CPU bus cycles; or (2) the trace is stopped after all outstanding bus cycles are completed.

With the trace output signals being stored in the trace, the trace may be started and halted at any time and software can search through the trace with full cognizance what address goes with what data. In the "Format" mode, TVD, TVA, TVB and SNOOP are valid trace output signals providing much information to the ICE™ base unit. For example, if TVA and TVB are being simultaneously asserted, the current cycle is a burst cycle so that four valid data packets are to be placed on the CPU bus. Similarly, if TVA is asserted and TVB is de-asserted, the current cycle is a normal cycle transferring one data packet. In these cases, SNOOP indicates the address is the last snoop request done on the CPU bus.

In "Raw" mode, the PIPE trace output is used to determine if software needs to search back through the trace to the last address when TVD is asserted (when PIPE="0") or search back two addresses through the trace (when PIPE="1"). This allows software to correlate the correct address with its' associated data during when pending bus cycles are outstanding. It is contemplated, however, that multiple PIPE trace outputs could be used for CPU supporting more than two outstanding bus cycles.

Referring back to FIGS. 3A–3C, the holding element 60 receives 36-bits of information from first and second pipe components 43a and 43b and the formatting controller 110 receives the internal command signals from either the second input port 36 or the bus tracking component 31. After the above-discussed operations, the holding element 60 transfers a 32-bit information packet to the ICE™ interface circuit 47 to re-format and synchronously aligning address and data within the packet provided in "Format" mode before transferring the packet to the ICE™ base unit.

Figure 8:
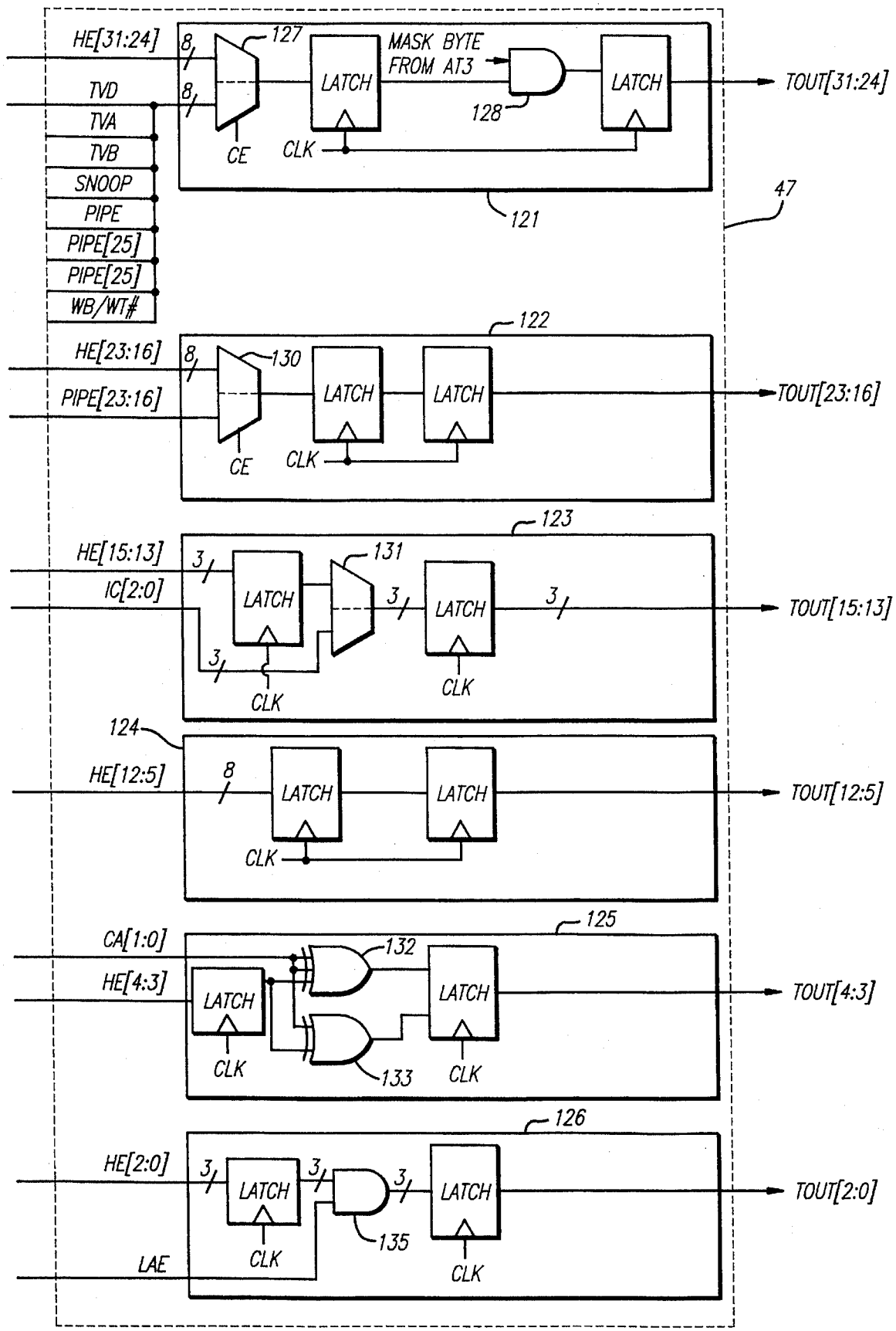
FIG. 8 is a circuit diagram of the ICE™ interface circuitry coupled to the formatting component.

Referring to FIG. 8, the ICE™ interface circuit 47 includes a plurality of combinatorial logic circuits 121–126 having at least two inputs and a single output transferred to the ICE™ base unit as listed in Tables 1–5 of Appendix A. When in "Format" mode these combinatorial logic circuits 121–126 coordinate that the information is synchronously aligned and transferred to the ICE™ base unit for its maximum efficiency. With respect to a first combinatorial logic circuit 121, it receives as input eight most significant bits of the information packet from the holding element 60 (labeled "HE[31:24]") and the trace output signals from the trace state machine 114 of the formatting controller 110. The signals are input into a multiplexer 127. Except for the fifth gate array, the configuration elements of the gate array are programmed to select the HE[31:24] to be TOUT[31:24] to the ICE™ base unit, which are output from the multiplexer 127 and input into a mask element 128 (e.g., AND gate with an enable signal) transferring a null byte (all logic "0" signals) in lieu of HE[31:24] if the mask element 128 is enabled. In the preferred embodiment, the mask element 128 is enabled (logic "1") unless the gate array is the third gate array and is operating in a burst cycle.

With respect to a second combinatorial circuit 122, next eight most significant bits from both the holding element 60 "HE[23:16]" and the pipe component 43a "PIPE[23:16]" are input into a multiplexer 130. The second combinatorial circuit 122 usually outputs HE[23:16] as output signals TOUT[23:16] to the ICE™ base unit, except if the second combinatorial circuit is within the fifth gate array. This allow signals asynchronous to ADS# to be sent to the ICE™ base unit under software control.

With respect to a third combinatorial circuit 123, it outputs the next three most significant bits of the packet (i.e., TOUT[15:13]) to the ICE™ base unit. The contents of TOUT[15:13] is normally corresponding signals HE[15:13] from the holding element, except when the gate array is the fifth gate array in which TOUT[15:13] is equivalent to IC[2:0] as defined in Appendix B.

With reference to a fourth combinatorial circuit 124, it simply passes HE[12:5] with appropriate delays through as output signals TOUT[12:5]. The delays are incurred so that TOUT[12:5] will be input into the ICE™ base unit concurrently with the other output signals.

With respect to a fifth combinatorial circuit 125, it outputs TOUT[4:3] which includes the fourth and fifth bits of the address A[4:3] for the third gate array. The fifth combinatorial circuit 125 includes HE[4:3] being latched and input into a pair of exclusive-or gates ("XORs") 132 and 133 and a count address "CA[1:0]", generated by the formatting component, being input into the pair of XORs 132 and 133. The formatting component generates the count address bits CA[1] and CA[O] to have different binary values if the CPU is in a burst cycle. This is done to increment A[4:3] during the burst cycle to avoid problems if a burst cycle is requested during a normal data transfer. (See Table F below). For a normal bus cycle, however, the formatting component sets CA[l] and CA[O] equal so that the output TOUT[4:3] is not incremented.

With reference to the sixth combinatorial logic component 126, HE[2:0] is latched and input into a mask element 135 which is enabled by the formatting component activating a low address enable CLAE"). In the third gate array, when a burst cycle occurs, all 64 bits are valid on the data bus. The byte enables, which are used to generate A[2:0] and AH[2:0] are not always valid. Therefore, during a burst cycle, A[2:0] is always inactive (logic "0" ) and AH[2:0] is always active ("logic "1" ). The second portion to the transmission transmits A[2:0] to the pipe component 43a which, in turn, transfers A[2:0] to the holding element 60. The holding element 60 transfers A[2:0] into HE[2:0] of the trace.

Referring back to FIGS. 3A–3C, the filtering circuitry 33a and 33b enables a testing operator to selectively trace a desired type of bus cycle (e.g., memory read cycle, input/ output write cycle, etc.). Due to the pipelined nature of the gate arrays, the filtering circuitry is operational only in the fifth gate array. Conventionally, any filtering of bus types is accomplished by the word recognizers in the ICE™ base unit which uses very limited vital resources.

Figure 9:
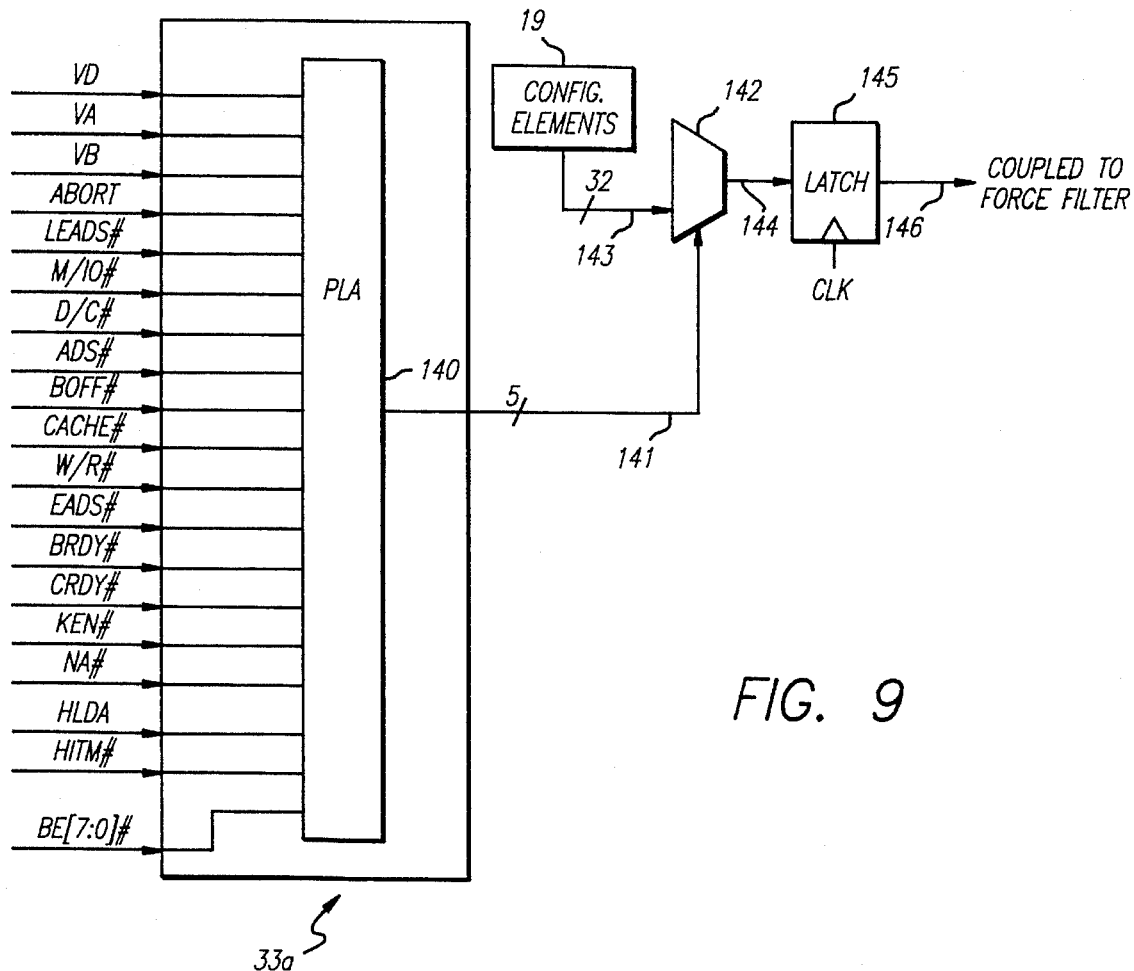
FIG. 9 a circuit diagram of the bus cycle filter of the filtering circuitry.

The filtering circuitry comprises a bus cycle filter 33a and a force filter 33b. As shown in FIG. 9, the bus cycle filter 33a comprises a programmable logic array ("PLA") 140 receiving as input signals the internal command signals (VB, VA, VB, ABORT, LEADS) from the bus tracking component of the fifth gate array, the byte-enables BE[7:0]# from the third gate array through the second input port and various control signals including M/IO#, D/C#, ADS#, BOFF#, CACHE#, W/R#, EADS#BRDY#, CRDY#, KEN#, NA#, HLDA and HITM#. Collectively, these signals are representative of all the CPU bus cycle types.

The PLA 140 translates the above-identified signals into a unique 5-bit binary representation of a bus cycle type for use as selecting signal lines 141 for multiple-input multiplexer 142 receiving inputs from the configuration element 19 through a number of bus-type lines 143 corresponding in number to the number of bus cycle types. Each of the inputs correspond to a different CPU bus cycle type. The configuration element 19 output an active-high voltage signal onto a corresponding bus-type line 143 if its corresponding bus cycle type is selected and a low-voltage signal if not.

For example, suppose the operator desires only to trace memory read cycles. Upon detection of a memory read cycle, the PLA 140 outputs a binary number corresponding in number to placement of a bus type line designated to memory read cycles. Since memory read cycles are to be traced, the corresponding bus-type line 143 has an active signal thereon. Thus, when selected by the selecting signal lines 141, a filter line 144 is active. However, upon detection of another bus cycle type, its corresponding input line would be inactive so that the filter line 144 is inactive. The filter line 144 is latched by a latch element 145 for proper delay and an output filter line 146 is coupled to the force filter 33b which, in turn, generates a valid trace frame signal (VTF#) which indicates to the ICE™ base unit to trace or not trace the particular bus cycle.

Figure 10:
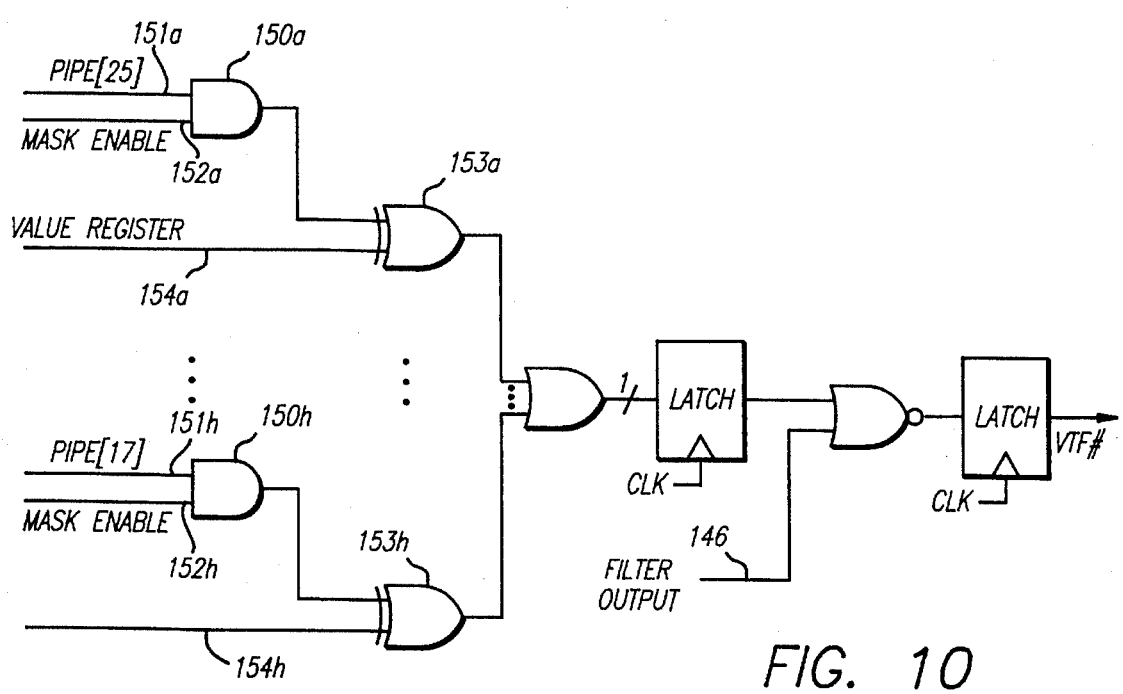
FIG. 10 is a circuit diagram of the force filter of the filtering circuitry.

Referring to FIG. 10, the force filter 33b is primarily used to filter non-bus type cycles such as breakpoints. This is accomplished by a plurality of logic gates 150a–150n ("n" being an arbitrary number) in parallel for outputting the non-bus type information from the Pipe component 43a via a non-bus filter lines 151a–151n (see FIGS. 3A–3C) when enabled by its corresponding mask enable 152a–152n. The mask enable lines 152a–152n are activated by the configuration element 19. The outputs of each of the logic gates 150a–150n are input into a first input of a corresponding plurality of XOR gates 153a–153n along with a value register 154a–154n from the configuration element 19, operating as a check of the output of the logic gates 150a–150n, is input into a second input of the corresponding XOR 153a–153n, respectively. Thus, according to a truth table of Table B illustrated below, the VTF# signal would be asserted indicating to the ICE™ base unit to trace the bus cycle based on the following:

TABLE B

Truth Table for Force Filter Component

| Pipe Input | Mask | Value | VTF# |
|---|---|---|---|
| X | 0 | 1 | 1 |
| X | 0 | 0 | 0 |
| 0 | 1 | 1 | 1 |
| 1 | 1 | 1 | 0 |
| 0 | 1 | 0 | 0 |
| 1 | 1 | 0 | 1 |

Thus, for all cycles (bus and non-bus cycles), the force filter of the filtering circuitry is constructed according to Table C:

TABLE C

Truth Table for the Filtering Circuitry

| Pipe Input | Mask | Value | Filter | VTF# |
|---|---|---|---|---|
| X | 0 | 0 | 0 | 1 |
| X | 0 | 0 | 1 | 0 |
| X | 0 | 1 | X | 0 |
| 0 | 1 | 0 | 0 | 1 |
| 0 | 1 | 0 | 1 | 0 |
| 1 | 1 | 0 | X | 0 |
| 0 | 1 | 1 | X | 0 |
| 1 | 1 | 1 | 0 | 1 |
| 1 | 1 | 1 | 1 | 0 |

The address translation circuitry re-formats implicit addresses into explicit address. This is done to simplify programming of the word recognizers in the ICE™ base unit so as to simplify the software needed to set up the word recognizers for boundary ranges. The byte enables need to be explicit (correlate exactly to what operation is desired). As shown, an address generated directly from the Pentium™ CPU includes byte enables but does not have the three least significant address bits Referring to FIG. 11, the first portion 34a of the address translation circuitry is illustrated and outputting valid information only within the third gate array. The purpose of the first portion 34a is to determine the high address boundary constraint "AH[2:0]" which signifies an upper boundary condition in order to give the highest byte address currently on the CPU bus for use by the word recognizers in the ICE™ to recognize byte addresses on a byte granularity instead of a packet granularity. The first portion includes a multiplexer 160 coupled to the latch component 42 to receive as input the byte-enables BE[7:0]# being input from the plurality of signal lines 41 as TIN[31:24] (see FIG. 2 and Table 3 of Appendix A). More specifically, BE[3:I]# and BE[7:5]# are input into the multiplexer 160 and either BE[3:I]# or BE[7:5]# is output from the multiplexer 160 through three output lines 161-163. The selection of BE[3:I]# or BE[7:5]# is accomplished through a select line 164 being an output of a NAND gate 165 having as inputs BE[7:4]#. If any of the BE[7:4]# are asserted (logic "0"), the NAND gate 165 outputs a logic "1" to a first high address boundary constraint bit AH[2] and selects the BE[7:5]# to be output from the multiplexer 160. Otherwise, the NAND gate 165 outputs a logic "0" to AH[2] and selects the BE[3:1]#.

In any event, a first and second byte enables transferred by a first and second output lines 161 and 162 are input into a second NAND gate 166 in which an output of the second NAND gate 166 represents a second high address boundary constraint bit "AH[1]." The first and a third byte enable transferred by the first and a third output lines 161 and 163 are input into a second multiplexer 167 being selected by the output of the second NAND gate 166. The output of the second multiplexer 167 is inverted and stored as a third high address boundary constraint bit "AH[0]." It is contemplated, however, that the first portion 34a of the address transition circuitry could be designed in a number of different constructions so as to at least comply with the truth table shown in Table D.

TABLE D

Truth Table for First Portion of the Address Translation Circuitry

| BE[7:0]# | | | | | | | | AH[2:0] | | |
|---|---|---|---|---|---|---|---|---|---|---|
| 7 | 6 | 5 | 4 | 3 | 2 | 1 | 0 | 2 | 1 | 0 |
| 0 | X | X | X | X | X | X | X | 1 | 1 | 1 |
| 1 | 0 | X | X | X | X | X | X | 1 | 1 | 0 |
| 1 | 1 | 0 | X | X | X | X | X | 1 | 0 | 1 |
| 1 | 1 | 1 | 0 | X | X | X | X | 1 | 0 | 0 |
| 1 | 1 | 1 | 1 | 0 | X | X | X | 0 | 1 | 1 |
| 1 | 1 | 1 | 1 | 1 | 0 | X | X | 0 | 1 | 0 |
| 1 | 1 | 1 | 1 | 1 | 1 | 0 | X | 0 | 0 | 1 |
| 1 | 1 | 1 | 1 | 1 | 1 | 1 | 0 | 0 | 0 | 0 |

Figure 12:
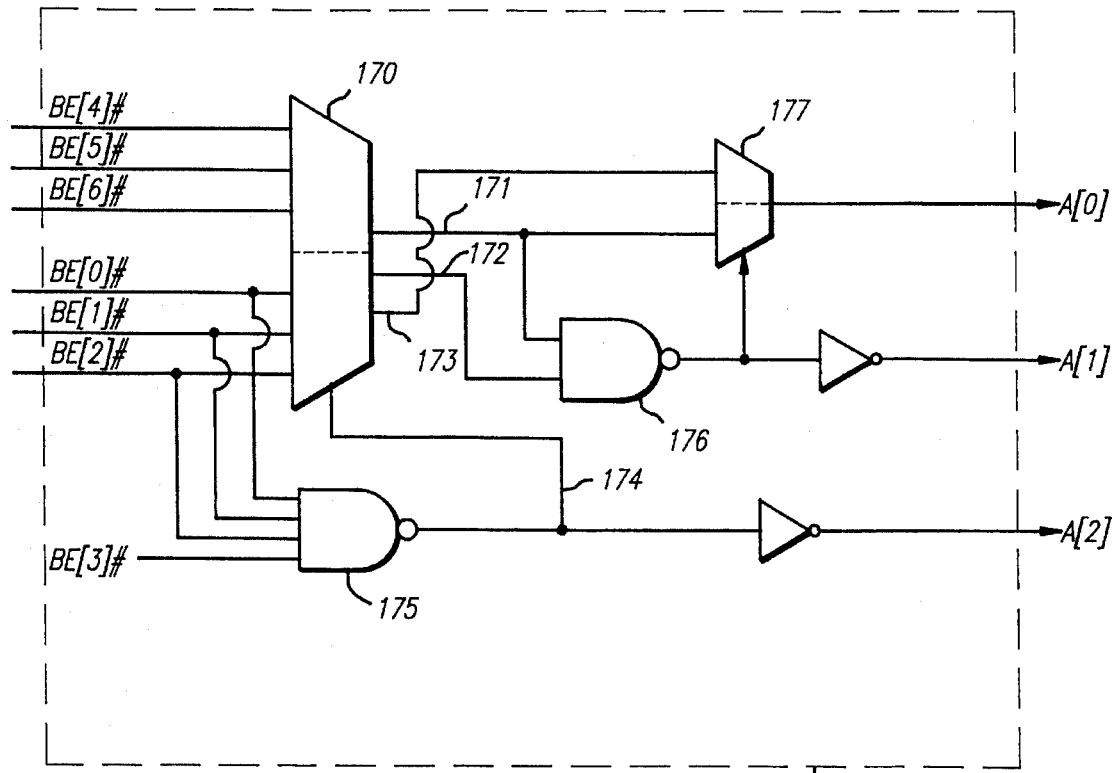
FIG. 12 is a circuit diagram of a second portion of the address translation circuitry for calculating the three least significant bits of the address "A[2:0]".

Referring to FIG. 12, the second portion 34b of the address translation circuitry is illustrated. The purpose of the second portion 34b is to determine A[2:0] which signifies an lower boundary condition in order to give the lowest byte address currently on the data bus. The second portion 34b includes a multiplexer 170 also coupled to the latch component 42 to receive as input the byte-enables BE[7:0]# as shown in FIG. 2 and Table 3 of Appendix A. BE[2:0]# and BE[6:4]# are input into the multiplexer 170 and either BE[2:0]# or BE[6:4]# is output from the multiplexer 170 through three output lines 171-173. The selection of BE[2:0]# or BE[6:4]# is accomplished through a select line 174 being an output of a NAND gate 175 having as inputs BE[3:0]#. If any of the BE[3:0]# are asserted (logic "0"), the NAND gate 175 outputs a logic "1" which selects BE[2:0]# to be output from the multiplexer 170 and the logic "1" is inverted and stored as A[2]. Otherwise, the NAND gate 175 outputs a logic "0" so as to store a logic "1" in A[2] and selects BE[6:4]#.

In any event, a first and second byte enables BE[1:0]# or BE[5:4]# transferred by a first and second output lines 171 and 172 are input into a second NAND gate in which an output of the second NAND gate 176 is inverted to represent A[1]. The first and a third byte enable are input into a second multiplexer 177 being selected by the output of the second NAND gate 176. The output of the second multiplexer 177 is stored as A[0]. It is contemplated, however, that the second portion 34b of the address transition circuitry could be designed in a number of different constructions so as to at least comply with the truth table shown in Table E.

TABLE E

Truth Table for a Second Portion of the Address Translation Circuitry

| BE[7:0]# | | | | | | | | A[2:0] | | |
|---|---|---|---|---|---|---|---|---|---|---|
| 7 | 6 | 5 | 4 | 3 | 2 | 1 | 0 | 2 | 1 | 0 |
| 0 | X | X | X | X | X | X | X | 1 | 1 | 1 |
| 1 | 0 | X | X | X | X | X | X | 1 | 1 | 0 |
| 1 | 1 | 0 | X | X | X | X | X | 1 | 0 | 1 |
| 1 | 1 | 1 | 0 | X | X | X | X | 1 | 0 | 0 |
| 1 | 1 | 1 | 1 | 0 | X | X | X | 0 | 1 | 1 |
| 1 | 1 | 1 | 1 | 1 | 0 | X | X | 0 | 1 | 0 |
| 1 | 1 | 1 | 1 | 1 | 1 | 0 | X | 0 | 0 | 1 |
| 1 | 1 | 1 | 1 | 1 | 1 | 1 | 0 | 0 | 0 | 0 |

Figure 11:
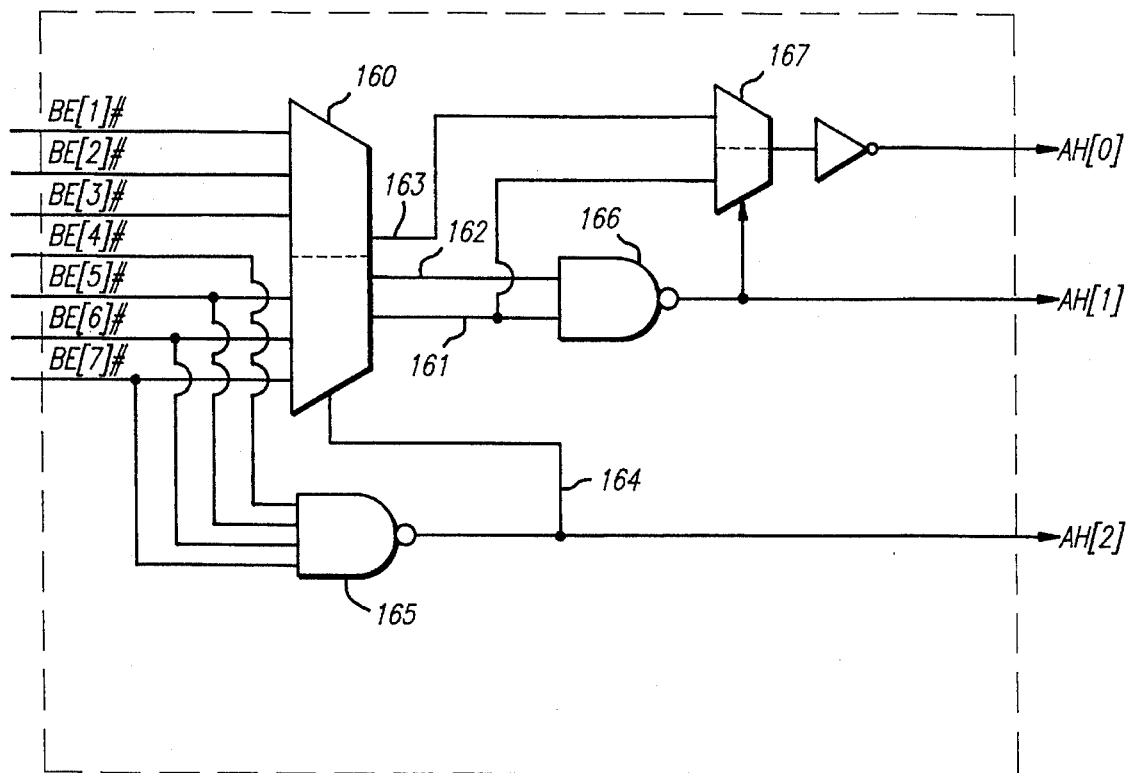
FIG. 11 is a circuit diagram of a first portion address translation circuitry designed to calculate the high address boundary constraint "AH[2:0]".

As illustrated in FIGS. 11–12 and Tables D–E, the address translation circuitry calculates the value of A[2:0] which is associated to an address range set to the binary number representing the least significant byte enable that is asserted. For example, if only a fourth and fifth byte enables BE[4:3]# are enabled, A[2:0] would be equal to binary "011" representing BE[3]#. The address translation circuitry further calculates AH[2:0] being a 3-bit binary number set to the number value of the most significant byte enable that is asserted. Using the previous example, AH[2:0] would equal binary number "100".

As shown in FIGS. 3A–3C, the address translation circuitry further includes a third portion 34c operational only for the first and second gate arrays to overcome a debugging problem associated with the Pentium™ CPU. More particularly, the Pentium™ CPU may alter its current bus cycle from a non-burst read bus cycle to a burst read bus cycle. Thus, the byte-enables, all of which are usually asserted for a burst read cycle since external hardware may want to cache a 32-byte read, are commonly incorrect. As a result, if such an event occurs, a "Force Zero" signal line 48 from the formatting component 32 is asserted (logic "0") so that the byte enables are asserted i.e., BEN[3:0]="0" and a "Force One" signal line 49 from the formatting component 32 is asserted (logic "1") (See FIGS. 3A–3C). Otherwise, the Force Zero line 48 remains de-asserted so that AH[2:0] or BEN[3:0]# is set to "111" or "1111" respectively for the third gate array.

The address translation circuitry further includes a fourth portion within the ICE™ filtering circuitry to increment A[4:3] appropriately for burst cycles. This is accomplished through the fifth combinatorial logic circuit 125 as illustrated in FIG. 8 to function according to Table F when the count address bits CA[1] and CA[0] are set by the formatting controller to be opposite to one another.

TABLE F

Truth Table for A[4] and A[3] For a Pentium™ Burst Cycle

| A4 | A3 | Address for First Transfer Cycle | Address for Second Data Transfer Cycle | Address for Third Data Transfer Cycle | Address for Fourth Data Transfer Cycle |
|---|---|---|---|---|---|
| 0 | 0 | 00H | 08H | 10H | 18H |
| 0 | 1 | 08H | 00H | 18H | 10H |
| 1 | 0 | 10H | 18H | 00H | 08H |
| 1 | 1 | 18H | 10H | 08H | 00H |

The present invention described herein may be designed using many different circuit designs. While the present invention has been described in terms of a specific embodiment, other embodiments may come to mind to those skilled in the art without departure from the spirit and scope of the present invention. The invention should, therefore, be measured in terms of the claims which follow.

APPENDIX A

TABLE 1

Inputs into the first input port TIN[31:0] and outputs from the first output port TOUT[31:0] and BEN[3:0] of the first Gate Array.

| SIGNAL NAME | INPUT | SIGNAL NAME | OUTPUT |
|---|---|---|---|
| TIN0 | D0 | TOUT0 | D0 |
| TIN1 | D1 | TOUT1 | D1 |
| TIN2 | D2 | TOUT2 | D2 |
| TIN3 | D3 | TOUT3 | D3 |
| TIN4 | D4 | TOUT4 | D4 |
| TIN5 | D5 | TOUT5 | D5 |

TABLE 1-continued

Inputs into the first input port TIN[31:0] and outputs from the first output port TOUT[31:0] and BEN[3:0] of the first Gate Array.

| SIGNAL NAME | INPUT | SIGNAL NAME | OUTPUT |
|---|---|---|---|
| TIN6 | D6 | TOUT6 | D6 |
| TIN7 | D7 | TOUT7 | D7 |
| TIN8 | D8 | TOUT8 | D8 |
| TIN9 | D9 | TOUT9 | D9 |
| TIN10 | D10 | TOUT10 | D10 |
| TIN11 | D11 | TOUT11 | D11 |
| TIN12 | D12 | TOUT12 | D12 |
| TIN13 | D13 | TOUT13 | D13 |
| TIN14 | D14 | TOUT14 | D14 |
| TIN15 | D15 | TOUT15 | D15 |
| TIN16 | D16 | TOUT16 | D16 |
| TIN17 | D17 | TOUT17 | D17 |
| TIN18 | D18 | TOUT18 | D18 |
| TIN19 | D19 | TOUT19 | D19 |
| TIN20 | D20 | TOUT20 | D20 |
| TIN21 | D21 | TOUT21 | D21 |
| TIN22 | D22 | TOUT22 | D22 |
| TIN23 | D23 | TOUT23 | D23 |
| TIN24 | D24 | TOUT24 | D24 |
| TIN25 | D25 | TOUT25 | D25 |
| TIN26 | D26 | TOUT26 | D26 |
| TIN27 | D27 | TOUT27 | D27 |
| TIN28 | D28 | TOUT28 | D28 |
| TIN29 | D29 | TOUT29 | D29 |
| TIN30 | D30 | TOUT30 | D30 |
| TIN31 | D31 | TOUT31 | D31 |
| | | BEN0 | BE0# |
| | | BEN1 | BE1# |
| | | BEN2 | BE2# |
| | | BEN3 | BE3# |

TABLE 2

Inputs into the first input port TIN[31:0] and outputs from the first output port TOUT[31:0] and BEN[3:0] of the second Gate Array.

| SIGNAL NAME | INPUT | SIGNAL NAME | OUTPUT |
|---|---|---|---|
| TIN0 | D32 | TOUT0 | D32 |
| TIN1 | D33 | TOUT1 | D33 |
| TIN2 | D34 | TOUT2 | D34 |
| TIN3 | D35 | TOUT3 | D35 |
| TIN4 | D36 | TOUT4 | D36 |
| TIN5 | D37 | TOUT5 | D37 |
| TIN6 | D38 | TOUT6 | D38 |
| TIN7 | D39 | TOUT7 | D39 |
| TIN8 | D40 | TOUT8 | D40 |
| TIN9 | D41 | TOUT9 | D41 |
| TIN10 | D42 | TOUT10 | D42 |
| TIN11 | D43 | TOUT11 | D43 |
| TIN12 | D44 | TOUT12 | D44 |
| TIN13 | D45 | TOUT13 | D45 |
| TIN14 | D46 | TOUT14 | D46 |
| TIN15 | D47 | TOUT15 | D47 |
| TIN16 | D48 | TOUT16 | D48 |
| TIN17 | D49 | TOUT17 | D49 |
| TIN18 | D50 | TOUT18 | D50 |
| TIN19 | D51 | TOUT19 | D51 |
| TIN20 | D52 | TOUT20 | D52 |
| TIN21 | D53 | TOUT21 | D53 |
| TIN22 | D54 | TOUT22 | D54 |
| TIN23 | D55 | TOUT23 | D55 |
| TIN24 | D56 | TOUT24 | D56 |
| TIN25 | D57 | TOUT25 | D57 |
| TIN26 | D58 | TOUT26 | D58 |
| TIN27 | D59 | TOUT27 | D59 |
| TIN28 | D60 | TOUT28 | D60 |
| TIN29 | D61 | TOUT29 | D61 |

TABLE 2-continued

Inputs into the first input port TIN[31:0] and outputs from the first output port TOUT[31:0] and BEN[3:0] of the second Gate Array.

| SIGNAL NAME | INPUT | SIGNAL NAME | OUTPUT |
|---|---|---|---|
| TIN30 | D62 | TOUT30 | D62 |
| TIN31 | D63 | TOUT31 | D63 |
|  |  | BEN0 | BE4# |
|  |  | BEN1 | BE5# |
|  |  | BEN2 | BE6# |
|  |  | BEN3 | BE7# |

TABLE 3

Inputs into the first input port TIN[31:0] and outputs from the first output port TOUT[31:0] and BEN[3:0] of the third Gate Array.

| SIGNAL NAME | INPUT | SIGNAL NAME | OUTPUT |
|---|---|---|---|
| TIN0 | — | TOUT0 | A0 |
| TIN1 | — | TOUT1 | A1 |
| TIN2 | — | TOUT2 | A2 |
| TIN3 | A3 | TOUT3 | A3 |
| TIN4 | A4 | TOUT4 | A4 |
| TIN5 | A5 | TOUT5 | A5 |
| TIN6 | A6 | TOUT6 | A6 |
| TIN7 | A7 | TOUT7 | A7 |
| TIN8 | A8 | TOUT8 | A8 |
| TIN9 | A9 | TOUT9 | A9 |
| TIN10 | A10 | TOUT10 | A10 |
| TIN11 | A11 | TOUT11 | A11 |
| TIN12 | A12 | TOUT12 | A12 |
| TIN13 | A13 | TOUT13 | A13 |
| TIN14 | A14 | TOUT14 | A14 |
| TIN15 | A15 | TOUT15 | A15 |
| TIN16 | A16 | TOUT16 | A16 |
| TIN17 | A17 | TOUT17 | A17 |
| TIN18 | A18 | TOUT18 | A18 |
| TIN19 | A19 | TOUT19 | A19 |
| TIN20 | A20 | TOUT20 | A20 |
| TIN21 | A21 | TOUT21 | A21 |
| TIN22 | A22 | TOUT22 | A22 |
| TIN23 | A23 | TOUT23 | A23 |
| TIN24 | BE0# | TOUT24 | BE0# |
| TIN25 | BE1# | TOUT25 | BE1# |
| TIN26 | BE2# | TOUT26 | BE2# |
| TIN27 | BE3# | TOUT27 | BE3# |
| TIN28 | BE4# | TOUT28 | BE4# |
| TIN29 | BE5# | TOUT29 | BE5# |
| TIN30 | BE6# | TOUT30 | BE6# |
| TIN31 | BE7# | TOUT31 | BE7# |
|  |  | BEN0 | AH0 |
|  |  | BEN1 | AH1 |
|  |  | BEN2 | AH2 |
|  |  | BEN3 | — |

TABLE 4

Inputs into the first input port TIN[31:0] and outputs from the the first output TOUT[31:0] and BEN[3:0] port of the fourth Gate Array.

| SIGNAL NAME | INPUT | SIGNAL NAME | OUTPUT |
|---|---|---|---|
| TIN0 | A24 | TOUT0 | A24 |
| TIN1 | A25 | TOUT1 | A25 |
| TIN2 | A26 | TOUT2 | A26 |
| TIN3 | A27 | TOUT3 | A27 |
| TIN4 | A28 | TOUT4 | A28 |
| TIN5 | A29 | TOUT5 | A29 |
| TIN6 | A30 | TOUT6 | A30 |

TABLE 4-continued

Inputs into the first input port TIN[31:0] and outputs from the the first output TOUT[31:0] and BEN[3:0] port of the fourth Gate Array.

| SIGNAL NAME | INPUT | SIGNAL NAME | OUTPUT |
|---|---|---|---|
| TIN1 | A31 | TOUT7 | A31 |
| TIN8 | — | TOUT8 |  |
| TIN9 | — | TOUT9 |  |
| TIN10 | — | TOUT10 |  |
| TIN11 | — | TOUT11 |  |
| TIN12 | A20M# | TOUT12 | A20M# |
| TIN13 | FLUSH# | TOUT13 | FLUSH# |
| TIN14 | INTR | TOUT14 | INTR |
| TIN15 | LOCK# | TOUT15 | LOCK# |
| TIN16 | SMI# | TOUT16 | SMI# |
| TIN17 | SMIACT# | TOUT17 | SMIACT# |
| TIN18 | PCD | TOUT18 | PCD |
| TIN19 | SCYC | TOUT19 | SCYC |
| TIN20 | NMI | TOUT20 | NMI |
| TIN21 | PWT | TOUT21 | PWT |
| TIN22 | AP | TOUT22 | AP |
| TIN23 | EWBE# | TOUT23 | EWBE# |
| TIN24 | BREQ | TOUT24 | BREQ |
| TIN25 | FERR# | TOUT25 | FERR# |
| TIN26 | FRCMC# | TOUT26 | FRCMC# |
| TIN27 | IERR# | TOUT27 | IERR# |
| TIN28 | IGNNE# | TOUT28 | IGNNE# |
| TIN29 | INV | TOUT29 | INV |
| TIN30 | HIT# | TOUT30 | HIT# |
| TIN31 | HOLD | TOUT31 | HOLD |
|  |  | BEN0 | — |
|  |  | BEN1 | — |
|  |  | BEN2 | — |
|  |  | BEN3 | — |

TABLE 5

Inputs into the first input port TIN[31:0] and outputs from the first output port TOUT[31:0] and BEN[3:0] of the fifth Gate Array.

| SIGNAL NAME | INPUT | SIGNAL NAME | OUTPUT |
|---|---|---|---|
| TIN0* | NA# | TOUT0 | NA# |
| TIN1 | CRDY# | TOUT1 | CRDY# |
| TIN2* | ADS# | TOUT2 | ADS# |
| TIN3* | BRDY# | TOUT3 | BRDY# |
| TIN4* | KEN# | TOUT4 | KEN# |
| TIN5* | CACHE# | TOUT5 | CACHE# |
| TIN6* | HITM# | TOUT6 | HITM# |
| TIN7* | HLDA | TOUT7 | HLDA |
| TIN8* | BOFF# | TOUT8 | BOFF# |
| TIN9* | AHOLD | TOUT9 | AHOLD |
| TIN10* | D/C# | TOUT10 | D/C# |
| TIN11* | W/R# | TOUT11 | W/R# |
| TIN12* | M/IO# | TOUT12 | M/IO# |
| TIN13 | — | TOUT13 | IC0 |
| TIN14 | — | TOUT14 | IC1 |
| TIN15 | — | TOUT15 | IC2 |
| TIN16 | INIT | TOUT16 | INIT |
| TIN17* | RESET | TOUT17 | RESET |
| TIN18* | IBT | TOUT18 | IBT |
| TIN19* | IV | TOUT19 | IV |
| TIN20* | IU | TOUT20 | IU |
| TIN21* | EADS# | TOUT21 | EADS# |
| TIN22 | BP3 | TOUT22 | BP3 |
| TIN23 | BP2 | TOUT23 | BP2 |
| TIN24 | BP1 | TOUT24 | BP1 |
| TIN25 | BP0 | TOUT25 | BP0 |
| TIN26 | WB/WT# | TOUT26 | WB/WT# |
| TIN27 | — | TOUT27 | PIPE |
| TIN28 | — | TOUT28 | TVB |
| TIN29 | — | TOUT29 | TVA |
| TIN30 | — | TOUT30 | TVD |

TABLE 5-continued

Inputs into the first input port TIN[31:0] and outputs from the first output port TOUT[31:0] and BEN[3:0] of the fifth Gate Array.

| SIGNAL NAME | INPUT | SIGNAL NAME | OUTPUT |
|---|---|---|---|
| TIN31 | — | TOUT31 | SNOOP |
|  |  | BEN0 | ICE MODE |
|  |  | BEN1 | RESET OUT |
|  |  | BEN2 | INIT OUT |
|  |  | BEN3 | VTF# |

APPENDIX B

| Symbol | Type* | Name and Function |
|---|---|---|
| A20M# | I | When the address bit 20 mask pin is asserted, the Pentium ™ CPU emulates the address wraparound at one Mbyte which occurs on the 8086. When A20M# is asserted, the Pentium ™ CPU masks physical address bit 20 (A20) before performing a lookup to the internal caches or driving a memory cycle on the bus. The effect of A20M# is undefined in protected mode. A20M# must be asserted only when the CPU is in real mode. |
| A31–A3 | I/O | As outputs, the address lines of the CPU along with the byte enables define the physical area of memory or I/O accessed. The external system drives the inquire address to the CPU on A31–A5. |
| ADS# | O | The address status indicates that a new valid bus cycle is currently being driven by the Pentium ™ CPU. |
| AHOLD | I | In response to the assertion of address hold, the Pentium ™ CPU will stop driving the address lines (A31–A3), and AP in the next clock. The rest of the bus will remain active so data can be returned or driven for previously issued bus cycles. |
| AP | I/O | Address parity is driven by the Pentium ™ CPU with even parity information on all Pentium ™ CPU generated cycles in the same clock that the address is driven. Even parity must be driven back to the Pentium ™ CPU during inquire cycles on this pin in the same clock as EADS# to ensure that the correct parity check status is indicated by the Pentium ™ CPU. |
| BE7#–BE0# | O | The byte enable pins are used to determine which bytes must be written to external memory, or which bytes were requested by the CPU for the current cycle. The byte enables are driven in the same clock as the address lines (A31–3). |
| BOFF# | I | The backoff input is used to abort all outstanding bus cycles that have not yet completed. In response to BOFF#, the Pentium ™ CPU will float all pins normally floated during bus hold in the next clock. The CPU remains in bus hold until BOFF# is negated at which time the Pentium ™ CPU restarts the aborted bus cycle(s) in their entirety. |
| BP[3:2] PM/BP[1:0] | O | The breakpoint pins (BP3–0) externally indicate a breakpoint match when the debug registers (DR3–0) are programmed to test for breakpoint matches. BP1 and BP0 are multiplexed with the Performance Monitoring pins (PM1 and PM0). The PB1 and PB0 bits in the Debug Mode Control Register determine if the pins are configured as breakpoint or performance monitoring pins. The pins come out of reset configured for performance monitoring. |
| BRDY# | I | The burst ready input indicates that the external system has presented valid data on the data pins in response to a read or that the external system has accepted the Pentium ™ CPU data in response to a write request. |
| BREQ | O | The bus request output indicates to the external system that the Pentium ™ CPU has internally generated a bus request. This signal is always driven whether or not the Pentium ™ CPU is driving its bus. |
| CACHE# | O | For Pentium ™ CPU-initiated cycles the cache pin indicates internal cacheability of the cycle (if a read), and indicates a burst writeback cycle (if a write). If this pin is driven inactive during a read cycle, Pentium ™ CPU will not cache the returned data, regardless of the state of the KEN# pin. This pin is also used to determine cycle length (number of transfers in the cycle). |

-continued

| Symbol | Type* | Name and Function |
|---|---|---|
| CLK | I | The clock input provides the fundamental timing for the Pentium ™ CPU. Its frequency is the internal operating frequency of the Pentium ™ CPU and requires TTL levels. |
| D/C# | O | The Data/Code output is one of the primary bus cycle definition pins. It is driven valid in the same clock as the ADS# signal is asserted. D/C# distinguishes between data and code or special cycles. |
| D63–D0 | I/O | These are the 64 data lines for the CPU. Lines D7–D0 define the least significant byte of the data bus; lines D63–D56 define the most significant byte of the data bus. During reads, the CPU samples the data bus when BRDY# is returned. |
| EADS# | I | The signal indicates that a valid external address has been driven onto the Pentium ™ CPU address pins to be used for an inquire cycle. |
| EWBE# | I | The external write buffer empty input, when active (high), indicates that a write cycle is pending in the external system. When the Pentium ™ CPU generates a write, and EWBE# is sampled inactive, the Pentium ™ CPU will hold off all subsequent writes to all Exclusive or Modified state lines in the data cache until all write cycles have completed, as indicated by EWBE# being active. |
| FERR# | O | The floating point error pin is driven active when an unmasked floating point error occurs. FERR# is similar to the ERROR# pin on the Intel 386 ™ math coCPU. FERR# is included for compatibility with systems using DOS type floating point error reporting. |
| FLUSH# | I | When asserted, the cache flush input forces the Pentium ™ CPU to writeback all modified lines in the data cache and invalidate its internal caches. A Flush Acknowledge special cycle will be generated by the Pentium ™ CPU indicating completion of the writeback and invalidation. If FLUSH# is sampled low when RESET transitions from high to low, tristate test mode is entered. |
| FRCMC# | I | The Functional Redundancy Checking Master/Checker mode input is used to determine whether the Pentium ™ CPU is configured in master mode or checker mode. When configured as a master, the Pentium ™ CPU drives its output pins as required by the bus protocol. When configured as a checker, the Pentium ™ CPU tristates when outputs and samples the output pins. The configuration as a master/checker is set after RESET and may not be changed other than by a subsequent RESET. |
| HIT# | O | The hit indication is driven to reflect the outcome of an inquire cycle. If an inquire cycle hits a valid line in either the Pentium ™ CPU data or instruction cache, this pin is asserted two clocks after EADS# is sampled asserted. If the inquire cycle misses Pentium ™ CPU cache, this pin is negated two clocks after EADS#. This pin changes its value only as a result of an inquire cycle and retains its value between the cycles. |
| HITM# | O | The hit to a modified line output is driven to reflect the outcome of an inquire cycle. It is asserted after inquire cycles which resulted in a hit to a modified line in the data cache. It is used to inhibit another bus master from accessing the data until the line is completely written back. |
| HLDA | O | The bus hold acknowledge pin goes active in response to a hold request driven to the CPU on the HOLD pin. It indicates that the Pentium ™ CPU has floated most of the output pins and relinquished the bus to another local bus master. When leaving bus hold, HLDA will be driven inactive and the Pentium ™ CPU will resume driving the bus. If the Pentium ™ CPU has bus cycle pending, it will be driven in the same clock that HLDA is deasserted. |
| HOLD | I | In response to the bus hold request, the Pentium ™ CPU will float most of its output and input/output pins and assert HLDA after completing all outstanding bus cycles. The Pentium ™ CPU will maintain its bus in this state until HOLD is deasserted. HOLD is not recognized during LOCK cycles. The Pentium ™ CPU will recognize HOLD during reset. |
| IBT | O | The instruction branch taken pin is driven active (high) for one clock to indicate that a branch was taken. This output is always driven by the Pentium ™ CPU. |
| IERR# | O | The internal error pin is used to indicate two types of errors, internal parity errors and functional redundancy errors. If a parity error occurs on a read from an internal array, the Pentium ™ CPU will assert the IERR# pin for one clock and |

-continued

| Symbol | Type* | Name and Function |
|---|---|---|
| | | then shutdown. If the Pentium ™ CPU is configured as a checker and a mismatch occurs between the value sampled on the pins and the corresponding value computed internally, the Pentium ™ CPU will assert IERR# two clocks after the mismatched value is returned. |
| IGNNE# | I | This is the ignore numeric error input. This pin has no effect when the NE bit in CR0 is set to 1. When the CRONE bit is 0, and the IGNNE# pin is asserted, the Pentium ™ CPU will ignore any pending unmasked numeric exception and continue executing floating point instructions for the entire duration that this pin is asserted. When the CRONE bit is 0, IGNNE# is not asserted, a pending unmasked numeric exception exists (SW.ES = 1), and the floating point instruction is one of FINIT, FCLEX, FSTENV, FSAVE, FSTSW, FSTCW, FENI, FDISI, or FSETPM, the Pentium ™ CPU will execute the instruction in spite of the pending exception. When the CRONE bit is 0, IGNEE# is not asserted, a pending unmasked numeric exception exists (SW.ES = 1), and the floating point instruction is one other than FINIT, FCLEX, FSTENV, FSAVE, FSTSW, FSTCW, FENI, FDISI, or FSETPM, the Pentium ™ CPU will Stop execution and wait for an external interrupt. |
| INIT | I | The Pentium ™ CPU initialization input pin forces the Pentium ™ CPU to begin execution in a known state. The CPU state after INIT is the same as the state after RESET except that the internal caches, write buggers, and floating pint registers retain the values they had prior to INIT. INIT may NOT be used in lieu of RESET after power-up. It INIT is sampled high when RESET transitions from high to low, the Pentium ™ CPU will perform built-in self test prior to the start of program execution. |
| INTR | I | An active maskable interrupt input indicates that an external interrupt has been generated. INTR must remain active until the first interrupt acknowledge cycle is generated to assure that the interrupt is recognized. |
| INV | I | The invalidation input determines the final cache line state (S or I) in case of an inquire cycle hit. It is sampled together with the address for the inquire cycle in the clock EADS# is sampled active. |
| IU | O | The unpipe instruction complete output is driven active (high) for 1 clock to indicate that an instruction in the u-pipeline has completed execution. This pin is always driven by the Pentium ™ CPU. |
| IV | O | The v-pipe instruction complete output is driven active (high) for one clock to indicate that an instruction in the v-pipeline has completed execution. This pin is always driven by the Pentium ™ CPU. |
| KEN# | I | The cache enable pin is used to determine whether the current cycle is cacheable or not and is consequently used to determine cycle length. When the Pentium ™ CPU generates a cycle that can be cached (CAHCE# asserted) and KEN# is active, the cycle will be transformed into a burst line fill cycle. |
| LOCK# | O | The bus lock pin indicates that the current bus cycle is locked. The Pentium ™ CPU will not allow a bus hold when LOCK# is asserted (but AHOLD and BOFF# are allowed). LOCK# goes active in the first clock of the first locked bus cycle and goes inactive after the BRDY# is returned to the last locked bus cycle. LOCK# is guaranteed to be deasserted for at least one clock between back to back locked cycles. |
| M/IO# | O | The Memory/Input-Output is one of the primary bus cycle definition pins. It is driven valid in the same clock as the ADS# signal is asserted. M/IO# distinguishes between memory and I/O cycles. |
| NA# | I | An active next address input indicates that the external memory system is ready to accept a new bus cycle although all data transfers for the current cycle have not yet completed. The Pentium ™ CPU will drive out a pending cycle two clocks after NA# is asserted. The Pentium ™ CPU supports up to 2 outstanding bus cycles. |
| NMI | I | The non-maskable interrupt request signal indicates that an external non-maskable interrupt has been generated. |
| PCD | O | The page cache disable pin reflects the state of the PCD bit in CR3, the Page Directory Entry, or the Page Table Entry. The purpose of PCD is to provide an external cacheablity indication on a page by page basis. |
| PWT | O | The page write through pin reflects the state of the PWT bit |

| Symbol | Type* | Name and Function |
|---|---|---|
| | | in CR3, the Page Directory Entry, or the Page Table Entry. The PWT pin is used to provide an external writeback indication on a page by page basis. |
| RESET | I | Reset forces the Pentium ™ CPU to begin execution at a known state. All the Pentium ™ CPU internal caches will be invalidated upon the RESET. Modified lines in the data cache are not written back. FLUSH#, FRCMC# and INIT are sampled when RESET transitions from high to low to determine if tristate test mode or checker mode will be entered, or if BIST will be run. |
| SCYC | O | The split cycle output is asserted during misaligned LOCKed transfers to indicate that more than two cycles will be locked together. This signal is defined for clocked cycles only. It is undefined for cycles which are not locked. |
| SMI# | I | The System Management Interrupt causes a system management interrupt request to be latched internally. When the latched SMI# is recognized on an instruction boundary, the CPU enters System Management Mode. |
| SMIACT# | O | An active system management interrupt active output indicates that the CPU is operating in System Management Mode (SMM). |
| W/R# | O | Write/Read is one of the primary bus cycle definition pins. It is driven valid in the same clock as the ADS# signal is asserted. W/R# distinguishes between write and read cycles. |
| WB/WT# | I | The writeback/writethrough input allows a data cache line to be defined as write back or write through on a line by line basis. As a result, it determines whether a cache line is initially in the S or E state in the data cache. |

What is claimed is:

1. A circuit for transferring information, which has been transmitted onto a dedicated bus from an electronic component to an ICE™ base unit for testing said electronic component, the circuit comprising:

a first gate array coupled to said dedicated bus and said ICE™ base unit, said first gate array monitors a first packet of data placed on said dedicated bus and for transferring said first packet of data to said ICE™ base unit;

a second gate array coupled to said dedicated bus and said ICE™ base unit, said second gate array monitors a second packet of data placed on said dedicated bus and transfers said second packet of data to said ICE™ base unit;

a third gate array coupled to said dedicated bus and said ICE™ base unit, said third gate array monitors address and byte enable signals placed on said dedicated bus and transfers said address and said byte enable signals to said ICE™ base unit for tracing, said third gate array being further coupled to a fifth gate array, said first gate array and said second gate array through a byte-enable bus for transferring said byte enable signals, a first portion of said byte enable signals and a second portion of said byte enable signals, respectively;

a fourth gate array coupled to said dedicated bus and said ICE™ base unit, said fourth gate array monitors address and control signals placed on said dedicated bus and transfers said address and said control signals to said ICE™ base unit; and said fifth gate array coupled to said dedicated bus and said ICE™ base unit, said fifth gate array monitors control signals placed on said dedicated bus and for transferring a plurality of control signals to said ICE™ base unit and a plurality of trace output signals to control tracing by said ICE™ base unit, said fifth gate array being further coupled to said first, second, third and fourth gate arrays through an inter-communication bus for transferring a plurality of internal command signals to said first, second, third and fourth gate arrays.

2. The circuit according to claim 1, wherein each of said gate arrays includes:

at least one multiplexer to selectively output signals input into one of a plurality of inputs, wherein a programmable configuration element selects said one of said plurality of inputs;

a bus tracking component to monitor a plurality of information signals from said information, generates a second plurality of information signals and transfers said second plurality of information signals into a first input of said at least one multiplexer as a third plurality of information signals are transferred into a second input of said at least one multiplexer from one of the plurality of gate arrays, wherein said at least one multiplexer selectively transmits one of said second and third plurality of information signals into a formatting component depending on which of said second and third plurality of information signals represent said plurality of internal command signals; and said formatting component to contain said information until a particular bus cycle associated with said information has completed, re-formats said plurality of internal command signals into said plurality of trace output signals as control information and transfers at least said information into said ICE™ base unit, wherein said plurality of trace output signals are transferred into said ICE™ base unit if selected by said programmable configuration element.

3. The circuit according to claim 2, wherein said bus tracking component includes a plurality of state machines, wherein a second and third state machine operate in the alternative to monitor said plurality of information signals transmitted onto said dedicated bus by said electronic component or said another electronic component, respectively.

4. The circuit according to claim 3, wherein said plurality of state machines further includes a first state machine which signals said formatting component that a snoop cycle has occurred on said dedicated bus.

5. The circuit according to claim 4, wherein said formatting component includes a holding element and a formatting controller.

6. The circuit according to claim 5, wherein said holding element includes a combinatorial logic circuit which temporarily contains said information until being signaled by said formatting controller to transfer said information.

7. The circuit according to claim 6, wherein said formatting controller includes a plurality of state machines which controls said holding element.

8. The circuit according to claim 7, wherein said formatting controller operates in one of a plurality of modes, wherein if operating in a first of said plurality of modes, said formatting controller synchronously aligns address and data of said information, and alternatively, if said formatting controller is operating in a second of said plurality of modes, said formatting controller transmits said address and data as transmitted onto said dedicated bus.

9. The circuit according to claim 2, wherein each of said gate arrays further includes filtering circuitry which asserts a valid trace frame signal upon detection by said filtering circuitry that a current cycle type is one of a number of cycle types permitted to be traced by said ICE™ base unit, said asserted valid trace frame signal informs said ICE™ base unit to trace a frame associated with said current cycle type, wherein said filtering circuitry is operational only within said fifth gate array.

10. The circuit according to claim 9, wherein said filtering circuitry includes a bus type filter, which activates a first signal line upon detection that said current cycle type is one of a number of bus cycle types permitted to be traced by said ICE™ base unit, and a force filter which activates a second signal line upon detection that said current cycle type is one of a number of non-bus cycle type permitted to be traced by said ICE™ base unit, wherein said valid trace frame signal is activated if at least one of said first and second signal lines is activated.

11. The circuit according to claim 2, wherein each of said gate arrays further includes address translation circuitry to calculate address information required by the ICE™ base unit, wherein said address translation circuitry includes:

a first translator which calculates an upper boundary condition in order to obtain a highest byte address currently on the dedicated bus for use by said ICE™ base unit; and a second translator means which calculates a lower boundary condition in order to obtain a lowest byte address currently on the dedicated bus for use by said ICE™ base unit, wherein said address translation circuitry is operational only within said third gate array.

12. A method for transferring information, which has been transmitted onto a dedicated bus for an electronic component by said electronic component or alternatively by another electronic component, to an ICE™ base unit for testing said electronic component, said method comprising the steps of:

providing a multiplexer having a plurality of inputs, wherein a programmable configuration element selects said one of plurality of inputs as an output;

providing a bus tracking component to monitor a plurality of information signals from said information, to generate a second plurality of information signals and to transfer said second plurality of information signals into a first input of said multiplexer as a third plurality of information signals are transferred into a second input of said multiplexer from one of the plurality of gate arrays, wherein said multiplexer selectively transmits one of said second and third plurality of information signals into a formatting component;

providing said formatting component to contain said information until a particular bus cycle associated with said information has completed, to re-format said internal command signals into corresponding trace output signals as control information and to transfer at least said information into said ICE™ base unit, wherein said trace output signals are transferred into said ICE™ base unit if selected by said programmable configuration element;

providing a filtering circuitry to assert a valid trace frame signal upon detection by said filtering circuitry that a current cycle type is one of a number of cycle types permitted to be traced by said ICE™ base unit, wherein said asserted valid trace frame signal informs said ICE™ base unit to trace a frame associated with said current cycle type; and providing address translation circuitry to calculate address information required by the ICE™ base unit.

13. Representing each of a plurality of gate arrays, a circuit for transferring information, which has been transmitted onto a dedicated bus for an electronic component by said electronic component or alternatively by another electronic component, to an ICE™ base unit for testing said electronic component, said circuit comprising:

multiplexing means for selectively outputting information signals input into one of a plurality of inputs, wherein a programmable configuration element selects said one of said plurality of inputs;

tracking means for monitoring a plurality of information signals from said information, generating a second plurality of information signals and transferring said second plurality of information signals into a first input of said multiplexing means as a third plurality of information signals are transferred into a second input of said multiplexing means from one of the plurality of gate arrays, wherein said multiplexing means selectively transmits one of said second and third plurality of information signals into a formatting means, depending on which of said second and third plurality of information signals represent internal command signals; and said formatting means for temporarily storing said information until a particular bus cycle associated with said information has completed, re-formatting said internal command signals into corresponding trace output signals and transferring at least said information into said ICE™ base unit, wherein said trace output signals are transferred into said ICE™ base unit if selected by said programmable configuration element.

14. The circuit according to claim 13, wherein said tracking means includes a plurality of state machines, wherein a second and third state machine operate in the alternative to monitor said plurality of information signals transmitted onto said dedicated bus by said electronic component or said another electronic component, respectively.

15. The circuit according to claim 14, wherein said plurality of state machines further includes a first state machine signaling said formatting means that a snoop cycle has occurred on said dedicated bus.

16. The circuit according to claim 13, wherein said formatting means includes a holding element and a formatting controller.

17. The circuit according to claim 16, wherein said holding element includes a combinatorial logic circuit which temporary contains said information until being signaled by said formatting controller to transfer said information.

18. The circuit according to claim 17, wherein said formatting controller includes a plurality of state machines which control said holding element.

19. The circuit according to claim 18, wherein said formatting controller operates in one of a plurality of modes, wherein if operating in a first of said plurality of modes, said formatting controller synchronously aligns address and data of said information, and alternatively, if said formatting controller is operating in a second of said plurality of modes, said formatting controller transmits said address and data as transmitted onto said dedicated bus.

20. The circuit according to claim 13, further including filtering means for asserting a valid trace frame signal upon detection by said filtering means that a current cycle type is one of a number of cycle types permitted to be traced by said ICE™ base unit, said asserted valid trace frame signal informs said ICE™ base unit to trace a frame associated with said current cycle type.

21. The circuit according to claim 20, wherein said filtering means includes a bus type filter, which activates a first signal line upon detection that said current cycle type is one of a number of bus cycle types permitted to be traced by said ICE™ base unit, and a force filter which activates a second signal line upon detection that said current cycle type is one of a number of non-bus cycle type permitted to be traced by said ICE™ base unit, wherein said valid trace frame signal is activated if at least one of said first and second signal lines is activated.

22. The circuit according to claim 13, further including address translation means for calculating address information required by said ICE™ base unit, wherein said address translation means includes:

first translation means for calculating an upper boundary condition in order to obtain a highest byte address currently on the dedicated bus for use by said ICE™ base unit; and second translation means for calculating a lower boundary condition in order to obtain a lowest byte address currently on the dedicated bus for use by said ICE™ base unit.

23. Representing each of a plurality of gate arrays, a circuit for transferring information, which has been transmitted onto a dedicated bus for an electronic component by said electronic component or alternatively by another electronic component, to an ICE™ base unit for testing said electronic component, said circuit comprising:

at least one multiplexer which selectively outputs information signals input into one of two inputs, wherein a programmable configuration element selects said one of two inputs;

a bus tracking component which monitors a plurality of information signals from said information, generates a second plurality of information signals and transfers said second plurality of information signals into a first input of said at least one multiplexer as a third plurality of information signals are transferred into a second input of said at least one multiplexer from one of the plurality of gate arrays, wherein said at least one multiplexer selectively transmits one of said second and third plurality of information signals into a formatting component depending on which of said second and third plurality of information signals represent internal command signals; and said formatting component which contains said information until a particular bus cycle associated with said information has completed, re-formats said internal command signals into corresponding trace output signals as control information and transfers at least said information into said ICE™ base unit, wherein said trace output signals are transferred into said ICE™ base unit if selected by said programmable configuration element.

24. The circuit according to claim 23, wherein said bus tracking component includes a plurality of state machines, wherein a second and third state machine operate in the alternative to monitor said plurality of information signals transmitted onto said dedicated bus by said electronic component or said another electronic component, respectively.

25. The circuit according to claim 24, wherein said plurality of state machines further includes a first state machine which signals said formatting component that a snoop cycle has occurred on said dedicated bus.

26. The circuit according to claim 23, wherein said formatting component includes a holding element and a formatting controller.

27. The circuit according to claim 26, wherein said holding element includes a combinatorial circuit which temporarily contains said information until being signaled by said formatting controller to transfer said information.

28. The circuit according to claim 27, wherein said formatting controller includes a plurality of state machines for controlling said holding element.

29. The circuit according to claim 28, wherein said formatting controller operates in one of a plurality of modes, wherein if operating in a first of said plurality of modes, said formatting controller synchronously aligns address and data of said information, and alternatively, if said formatting controller is operating in a second of said plurality of modes, said formatting controller transmits said address and data as transmitted onto said dedicated bus.

30. The circuit according to claim 23, further including filtering circuitry which asserts a valid trace frame signal upon detection by said filtering circuitry that a current cycle type is one of a number of cycle types permitted to be traced by said ICE™ base unit, said asserted valid trace frame signal informs said ICE™ base unit to trace a frame associated with said current cycle type.

31. The circuit according to claim 30, wherein said filtering circuitry includes a bus type filter, which activates a first signal line upon detection that said current cycle type is one of a number of bus cycle types permitted to be traced by said ICE™ base unit, and a force filter which activates a second signal line upon detection that said current cycle type is one of a number of non-bus cycle type permitted to be traced by said ICE™ base unit, wherein said valid trace frame signal is activated if at least one of said first and second signal lines is activated.

32. The circuit according to claim 23, further including an address translation circuitry to calculate address information required by the ICE™ base unit, wherein said address translation circuitry includes:

a first translator which calculates an upper boundary condition in order to obtain a highest byte address currently on the dedicated bus for use by said ICE™ base unit; and second translator which calculates a lower boundary condition in order to obtain a lowest byte address currently on the dedicated bus for use by said ICE™ base unit.

33. A circuit for transferring information, which has been transmitted onto a dedicated bus from an electronic component to an ICE™ base unit in order to test the electronic component, the circuit comprising:

first array means, being coupled to said dedicated bus and said ICE™ base unit, for monitoring a first packet of data placed on said dedicated bus and for transferring said first packet of data to said ICE™ base unit;

second array means, being coupled to said dedicated bus said ICE™ base unit, for monitoring a second packet of data placed on said dedicated bus and for transferring said second packet of data to said ICE™ base unit;

third array means, being coupled to said dedicated bus and said ICE™ base unit, for monitoring address and byte enable signals placed on said dedicated bus and for transferring said address and said byte enable signals to said ICE™ base unit, said third array means being further coupled to a fifth array means, said first array means and said second array means through a byte-enable bus for transferring said byte enable signals, a first portion of said byte enable signals and a second portion of said byte enable signals, respectively;

fourth array means, being coupled to said dedicated bus and said ICE™ base unit, for monitoring address and control signals placed on said dedicated bus and for transferring said address and said control signals to said ICE™ base unit; and said fifth array means, being coupled to said dedicated bus and said ICE™ base unit, for monitoring control signals placed on said dedicated bus and for transferring a plurality of control signals to said ICE™ base unit and a plurality of trace output signals for controlling tracing by said ICE™ base unit, said fifth array means being further coupled to said first, second, third and fourth array means through an inter-communication bus for transferring a plurality of internal command signals to said first, second, third and fourth array means.

34. The circuit according to claim 33, wherein each of said array means includes:

multiplexing means for selectively outputting information signals input into one of two inputs, wherein a programmable configuration element selects said one of two inputs;

tracking means for continuously monitoring a plurality of information signals from said information, generating a second plurality of information signals and transferring said second plurality of information signals into a first input of said multiplexing means as a third plurality of information signals are transferred into a second input of said multiplexing means from one of the plurality of gate arrays, wherein said multiplexing means selectively transmits one of said second and third plurality of information signals into a formatting means, depending on which of said second and third plurality of information signals represent said plurality of internal command signals; and said formatting means for temporarily storing said information until a particular bus cycle associated with said information has completed, re-formatting said plurality of internal command signals into said plurality of trace output signals as control information and transferring at least said information into said ICE™ base unit, wherein said plurality of trace output signals are transferred into said ICE™ base unit if selected by said programmable configuration element.

35. The circuit according to claim 34, wherein said tracking means includes a plurality of state machines, wherein a second and third state machine operate in the alternative to monitor said plurality of information signals transmitted onto said dedicated bus by said electronic component or said another electronic component, respectively.

36. The circuit according to claim 35, wherein said plurality of state machines further includes a first state machine which signals said formatting means that a snoop cycle has occurred on said dedicated bus.

37. The circuit according to claim 34, wherein said configuration element for said fifth array is programmed to enable said tracking means for said fifth array means to transfers said plurality of trace output signals to said ICE™ base unit.

38. The circuit according to claim 36, wherein said formatting means includes a holding element and a formatting controller.

39. The circuit according to claim 38, wherein said holding element includes a combinatorial logic circuit which temporarily contains said information until being signaled by said formatting controller to transfer said information.

40. The circuit according to claim 39, wherein said formatting controller includes a plurality of state machines which control said holding element.

41. The circuit according to claim 40, wherein said formatting controller operates in one of a plurality of modes, wherein if operating in a first of said plurality of modes, said formatting controller synchronously aligns address and data of said information, and alternatively, if said formatting controller is operating in a second of said plurality of modes, said formatting controller transmits said address and data as transmitted onto said dedicated bus.

42. The circuit according to claim 41, wherein each of said array means further includes filtering means for asserting a valid trace frame signal upon detection by said filtering means that a current cycle type is one of a number of cycle types permitted to be traced by said ICE™ base unit, said asserted valid trace frame signal informs said ICE™ base unit to trace a frame associated with said current cycle type, wherein said filtering means is operational only within said fifth array means.

43. The circuit according to claim 42, wherein said filtering means includes a bus type filter, which activates a first signal line upon detection that said current cycle type is one of a number of bus cycle types permitted to be traced by said ICE™ base unit, and a force filter which activates a second signal line upon detection that said current cycle type is one of a number of non-bus cycle type permitted to be traced by said ICE™ base unit, wherein said valid trace frame signal is activated if at least one of said first and second signal lines is activated.

44. The circuit according to claim 42, wherein each of said array means further includes address translation means for calculating address information required by said ICE™ base unit, wherein said address translation means includes:

first translation means for calculating an upper boundary condition in order to obtain a highest byte address currently on the dedicated bus for use by said ICE™ base unit; and second translation means for calculating a lower boundary condition in order to obtain a lowest byte address currently on the dedicated bus for use by said ICE™ base unit, wherein said address translation means is operational only within said third array means.

* * * * *

UNITED STATES PATENT AND TRADEMARK OFFICE
CERTIFICATE OF CORRECTION

| | | |
|---|---|---|
| PATENT NO. | : | 5,537,536 |
| DATED | : | July 16, 1996 |
| INVENTOR(S) | : | Andrew Groves |

It is certified that error appears in the above-identified patent and that said Letters Patent is hereby corrected as shown below:

In column 13 at line 40 delete "CLAE")." and insert --("LAE").--

In column 20 at line 9 delete "TIN1" and insert --TIN7--

In column 25 in the "IU" line delete "unpipe" and insert --u-pipe--

In column 31 at line 3 delete "temporary" and insert --temporarily--

Signed and Sealed this

Eighth Day of April, 1997

Attest:

BRUCE LEHMAN

Attesting Officer

Commissioner of Patents and Trademarks